(12) United States Patent
Van Loon et al.

(10) Patent No.: US 10,894,393 B2
(45) Date of Patent: Jan. 19, 2021

(54) MULTILAYER FILMS AND METHODS OF MAKING THE SAME

(71) Applicant: ExxonMobil Chemical Patents Inc., Baytown, TX (US)

(72) Inventors: Achiel J. M. Van Loon, Antwerp (BE); Danny Van Hoyweghen, Heverlee (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 254 days.

(21) Appl. No.: 15/632,700

(22) Filed: Jun. 26, 2017

(65) Prior Publication Data

US 2018/0001604 A1   Jan. 4, 2018

Related U.S. Application Data

(60) Provisional application No. 62/356,333, filed on Jun. 29, 2016.

(51) Int. Cl.
*B32B 27/08* (2006.01)
*B32B 27/32* (2006.01)
(Continued)

(52) U.S. Cl.
CPC .............. *B32B 27/08* (2013.01); *B29C 65/70* (2013.01); *B32B 5/022* (2013.01); *B32B 7/02* (2013.01); *B32B 7/04* (2013.01); *B32B 7/12* (2013.01); *B32B 15/06* (2013.01); *B32B 15/082* (2013.01); *B32B 15/085* (2013.01); *B32B 15/20* (2013.01); *B32B 21/045* (2013.01); *B32B 21/08* (2013.01); *B32B 25/04* (2013.01); *B32B 25/06* (2013.01); *B32B 25/08* (2013.01); *B32B 25/10* (2013.01); *B32B 25/16* (2013.01); *B32B 25/18* (2013.01); *B32B 27/06* (2013.01); *B32B 27/10* (2013.01); *B32B 27/12* (2013.01); *B32B 27/24* (2013.01); *B32B 27/302* (2013.01); *B32B 27/304* (2013.01); *B32B 27/306* (2013.01); *B32B 27/32* (2013.01); *B32B 27/325* (2013.01); *B32B 27/34* (2013.01); *B32B 27/36* (2013.01); *B32B 37/15* (2013.01); *B29K 2023/083* (2013.01); *B32B 2250/03* (2013.01); *B32B 2250/05* (2013.01); *B32B 2262/0253* (2013.01); *B32B 2270/00* (2013.01); *B32B 2274/00* (2013.01); *B32B 2307/558* (2013.01); *B32B 2307/5825* (2013.01); *B32B 2307/704* (2013.01);
(Continued)

(58) Field of Classification Search
CPC ...... B32B 2307/558; B32B 2307/5825; B32B 27/08; B32B 27/306; B32B 27/32; B32B 37/15; B32B 7/02; B32B 2250/05; B32B 2250/42; B32B 25/04
See application file for complete search history.

(56) References Cited

U.S. PATENT DOCUMENTS 4,619,859 A * 10/1986 Yoshimura .............. B32B 27/32
                                                              428/213
8,124,243 B2    2/2012 Wright et al.
(Continued)

OTHER PUBLICATIONS

Polypropylene (Polymer Science Learning Center pslc.ws/macrog/pp.htm) accessed Jul. 23, 2019.*

*Primary Examiner* — Alicia J Sawdon

(57) ABSTRACT

Disclosed are multilayer films with high toughness performance, where the films have an elastic ethylene copolymer in the core layer.

20 Claims, 1 Drawing Sheet

(51) Int. Cl.
| | |
|---|---|
| *B32B 27/30* | (2006.01) |
| *B32B 7/02* | (2019.01) |
| *B32B 37/15* | (2006.01) |
| *B29C 65/70* | (2006.01) |
| *B32B 25/04* | (2006.01) |
| *B32B 15/082* | (2006.01) |
| *B32B 25/08* | (2006.01) |
| *B32B 25/16* | (2006.01) |
| *B32B 21/08* | (2006.01) |
| *B32B 27/06* | (2006.01) |
| *B32B 27/12* | (2006.01) |
| *B32B 25/06* | (2006.01) |
| *B32B 27/36* | (2006.01) |
| *B32B 7/12* | (2006.01) |
| *B32B 5/02* | (2006.01) |
| *B32B 27/10* | (2006.01) |
| *B32B 21/04* | (2006.01) |
| *B32B 25/10* | (2006.01) |
| *B32B 15/085* | (2006.01) |
| *B32B 27/24* | (2006.01) |
| *B32B 25/18* | (2006.01) |
| *B32B 27/34* | (2006.01) |
| *B32B 7/04* | (2019.01) |
| *B32B 15/06* | (2006.01) |
| *B32B 15/20* | (2006.01) |
| *B29K 23/00* | (2006.01) |

(52) U.S. Cl.
CPC ..... *B32B 2307/72* (2013.01); *B32B 2307/732* (2013.01); *B32B 2410/00* (2013.01); *B32B 2437/02* (2013.01); *B32B 2439/00* (2013.01); *B32B 2439/06* (2013.01); *B32B 2439/70* (2013.01); *B32B 2553/00* (2013.01); *B32B 2553/023* (2013.01); *B32B 2555/02* (2013.01); *B32B 2556/00* (2013.01)

(56) References Cited

U.S. PATENT DOCUMENTS

| | | | |
|---|---|---|---|
| 8,497,352 B2 | 7/2013 | Tse et al. | |
| 9,126,269 B2 | 9/2015 | Ohlsson et al. | |
| 2004/0048019 A1* | 3/2004 | Ohlsson | B32B 27/32 428/35.7 |
| 2011/0268979 A1* | 11/2011 | Ambroise | C08L 23/04 428/516 |
| 2015/0111092 A1* | 4/2015 | Janousek | B32B 27/08 429/163 |
| 2015/0231861 A1* | 8/2015 | Hu | B32B 37/00 428/213 |

\* cited by examiner

MULTILAYER FILMS AND METHODS OF MAKING THE SAME

PRIORITY CLAIM

This application claims priority to U.S. Provisional Application Ser. No. 62/356,333 filed Jun. 29, 2016, incorporated by reference in its entirety.

FIELD OF THE INVENTION

This invention relates to films, and in particular, to multilayer films comprising ethylene copolymer and methods for making such films.

BACKGROUND OF THE INVENTION

Coextruded blown films are widely used in a variety of packaging as well as other applications. Film properties are often subject to the combined effect of the coextrusion process conditions and polymer compositions selected for the different layers. In order to address requirements of particular end-uses, film producers have to accordingly highlight certain film properties while balancing different mechanical properties repulsive to each other to make stronger films for a given thickness. It is desirable for films, particularly those used for packaging applications, to be resistant to damage by puncture and yielding under stress. Therefore, films with good toughness characteristics, including tensile strength and puncture resistance, are needed in such applications. Additionally, thin films that exhibit high strength requirements provide a better cost-performance relationship for the consumer.

Among all polymers used for coextruded blown films, ethylene polymers, such as low density polyethylene (LDPE), linear low density polyethylene (LLDPE) prepared by Ziegler-Natta catalyst in a gas phase process, and blends thereof, have been readily available at a low manufacturing cost sufficient to justify commercial applications. More recently, metallocene polyethylenes (mPEs), which are also known to have extended versatilities and down-gauging potential, have also been introduced and increased in the films to further enhance toughness-related mechanical performance.

Since it was first invented, three-layer blown film coextrusion has improved the mechanical properties of films tremendously relative to films made with the same composition in a monolayer construction. However, the limit of maximum achievable with three-layer films appears to have been reached in many specific applications using the available selection of ethylene polymers. In response, five-layer structure has been employed to facilitate selective improvement on desired properties and fine-tuning of property profile by splitting the functionality and extending potential of the conventional three-layer structure with the increased number of layers.

U.S. Pat. No. 8,124,243 relates to thermoplastic films for use in bags including at least a core layer comprising an ethylene copolymer, wherein the films are subjected to post-quench biaxial orientation are provided. U.S. Pat. No. 8,497,325 provides a film comprising a blend composition comprising: 1) a linear ethylene containing polymer, such as a LLDPE, a HDPE; and at least 1 weight percent of an in-reactor polymer blend comprising: (a) a first ethylene containing polymer having a density of greater than 0.90 g/cm$^3$ and a M$_w$ of more than 20,000 g/mol; and (b) a second ethylene containing polymer having a density of less than 0.90 g/cm$^3$, wherein the polymer blend has a T$_m$ of at least 90° C., a density of less than 0.92 g/cm$^3$, and the densities of the first and second polymers differ by at least 1%. U.S. Pat. No. 9,126,269 discloses a multilayer blown film with improved strength or toughness comprising a layer comprising a mPE having a high melt index ratio, a layer comprising an mPE having a low MIR, and a layer comprising a HDPE, and/or LDPE. The films disclosed in these references are frequently characterized by limited toughness and strength properties.

Thus, there remains a need for a film with a better balance of impact strength and tear resistance. The inventors have found that such objective can be achieved by introducing an elastic ethylene copolymer into specific film layers, particularly in the core/middle layer. The inventive film demonstrates tear strength and impact resistance, superior to those in absence of the elastic material, which indicates a well-balanced toughness profile favored by most end-uses in the industry.

SUMMARY OF THE INVENTION

Provided are multilayer films comprising ethylene copolymer and methods for making such films.

DETAILED DESCRIPTION OF THE PRESENT INVENTION

Figure 1:
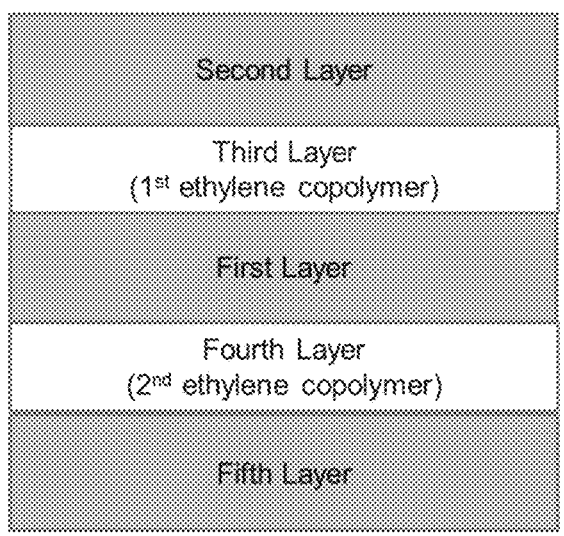
FIG. 1 illustrates a cross-sectional view of a film structure for the inventive films of Example 1, according to an embodiment of the invention.

Various specific embodiments will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the present inventions defined by the claims. The use of headings is for purposes of convenience only and does not limit the scope of the present invention.

As used herein, "polymer" may refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. A "terpolymer" is a polymer having three monomer units that are different from each other. The term "different" as used to refer to monomer units indicates that the monomer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene," "ethylene polymer," and "ethylene-based polymer" mean a polymer or copolymer comprising at least 50 mol % ethylene units (preferably at least 70 mol % ethylene units, more preferably at least 80 mol % ethylene units, even more preferably at least 90 mol % ethylene units, even more preferably at least 95 mol % ethylene units or 100 mol % ethylene units (in the case of a homopolymer)). Furthermore, the term "polyethylene composition" means a composition containing one or more polyethylene components.

As used herein, the term "ethylene copolymer" refers to a copolymerization product of ethylene and one or more α-olefins, including not only copolymers comprising at least 50 mol % ethylene units but also those comprising less than 50 mol % ethylene units.

As used herein, when a polymer is referred to as comprising a monomer, the monomer is present in the polymer in the polymerized form of the monomer or in the derivative form of the monomer. When a polymer is said to comprise a certain percentage, wt %, of a monomer, that percentage of monomer is based on the total amount of monomer units in the polymer.

For purposes of this invention, an ethylene polymer having a density of 0.910 to 0.940 g/cm$^3$ is referred to as a "low density polyethylene" (LDPE); an ethylene polymer having a density of 0.890 to 0.930 g/cm$^3$, that is linear and does not contain a substantial amount of long-chain branching is referred to as "linear low density polyethylene" (LLDPE) and can be produced with conventional Ziegler-Natta catalysts, vanadium catalysts, or with metallocene catalysts in gas phase reactors, high pressure tubular reactors, and/or in slurry reactors and/or with any of the disclosed catalysts in solution reactors. "Linear" means that the polyethylene has no or only a few long-chain branches, typically referred to as a g'vis of 0.97 or above. An ethylene polymer having a density of more than 0.940 g/cm$^3$ is referred to as a "high density polyethylene" (HDPE).

As used herein, "elastomer" or "elastomer composition" refers to any polymer or composition of polymers (such as blends of polymers) consistent with the ASTM D1566 definition. Elastomer includes mixed blends of polymers such as melt mixing and/or reactor blends of polymers.

As used herein, a "plastomer" means ethylene-based copolymers having a density in the range of about 0.85 to 0.915 g/cm$^3$ ASTM D 4703 Method B and ASTM D1505. Plastomers useful in the compositions described herein typically exhibit a MFR of from about 0.5 to about 30 g/10 min. Plastomers useful in the compositions include copolymers of ethylene derived units and higher α-olefin derived units such as propylene, 1-butene, 1-hexene, and 1-octene.

As used herein, "first" layer, "second" layer, "third" layer, "fourth" layer, "fifth" layer, "core" layer, "outer" layer, and "inner" layer are merely identifiers used for convenience, and shall not be construed as limitation on individual layers, their relative positions, or the laminated structure, unless otherwise specified herein.

As used herein, "first" ethylene copolymer and "second" ethylene copolymer are merely identifiers used for convenience, and shall not be construed as limitation on individual ethylene copolymer, their relative order, or the number of ethylene copolymers used, unless otherwise specified herein.

As used herein, film layers that are the same in composition and in thickness are referred to as "identical" layers.

As used herein, a film "free of" a component refers to a film substantially devoid of the component, or comprising the component in an amount of less than about 0.01 wt %, based on total weight of the film.

Ethylene Copolymer

In one aspect of the present invention, ethylene copolymers that can be used for the multilayer film described herein may comprise at least one of the following: (a) a low crystalline polymer comprising greater than or equal to about 70 wt % units derived from ethylene, less than or equal to about 30 wt % units derived from propylene, and less than about 5 wt % of units derived from $C_4$-$C_{20}$ α-olefins, having the following properties: (i) crystallinity derived from ethylene; (ii) a heat of fusion of about 20 to about 85 J/g; (iii) a polydispersity index (Mw/Mn) of less than about 2.5; (iv) a reactivity ratio of about 0.5 to about 1.5; (v) a proportion of inversely inserted propylene units based on 2, 1 insertion of propylene monomer in all propylene insertions, as measured by 13C NMR of less than 0.5 wt %; and (vi) a branching index greater than about 0.5; wherein the polymer is prepared in a single reactor; (b) a low crystalline polymer blend composition, comprising: (i) from 65 wt % to 90 wt % based on the total weight of the blend of an ethylene α-olefin elastomer having either no crystallinity or crystallinity derived from ethylene, having 70 wt % or more units derived from ethylene; and (ii) from 10 wt % to 35 wt % based on the total weight of the blend of a propylene polymer having 40 wt % or more units derived from propylene, including isotactically arranged propylene derived sequences; wherein the ethylene α-olefin elastomer and the propylene polymer are prepared in separate reactors arranged in parallel configuration; (c) a propylene-based elastomer, having at least about 60 wt % propylene-derived units and about 3 to about 25 wt % ethylene-derived units, based on total weight of the propylene-based elastomer, and a heat of fusion of less than about 80 J/g; (d) an ethylene-propylene rubber, such as ethylene-propylenediene terpolymer (EPDM); (e) an ethylene-based plastomer, having about 15 to about 35 wt % units derived from $C_4$-$C_{10}$ α-olefins, based on total weight of the ethylene-based plastomer; and (f) an ethylene-vinyl acetate (EVA).

Low Crystalline Ethylene Polymer

In one preferred embodiment, the ethylene copolymer used in the multilayer film described herein may comprise a low crystalline ethylene polymer. The low crystalline ethylene polymers described herein are predominantly ethylene, i.e., having more than 70 wt % units derived from ethylene monomer. In one or more of the compositions described herein, the ethylene content of the ethylene polymer is greater than or equal to about 70 wt %, preferably greater than about 75 wt %, or 77 wt % to less than about 85 wt % or about 90 wt %. In an embodiment, the ethylene polymer has a propylene content of less than about 30 wt %, preferably 25%, or 23 wt % to greater than about 15 wt % or about 10 wt %. In an embodiment, the ethylene polymer has a $C_4$-$C_{20}$ α-olefin content of less than about 5 wt %.

Preferably, the low crystalline polymer has some crystalline (including "semi-crystalline"), also referred to herein as "crystallinity derived from ethylene." But any crystallinity of the polymer is preferably derived from the ethylene. The percent crystallinity in such cases is measured as a percentage of polyethylene crystallinity and thus the origin of the crystallinity from ethylene is established.

Preferably, in addition to units derived from ethylene, the polymer also includes units derived from an α-olefin monomer. Suitable α-olefin monomers include, but are not limited to propylene, butene, pentene, hexene, heptene, or octene, and their isomers. Advantageously, the polymer can be formulated using different α-olefin monomers, selected from the list above, and/or different amounts of monomers, e.g., ethylene and α-olefin monomers, to prepare different types of polymers, e.g., ethylene polymers having desired properties.

Preferably, the polymer includes (or is) a polymer, which is preferably an ethylene polymer (including ethylene-cyclic olefin and ethylene α-olefin-diolefin) having high molecular weight (as measured by Mooney Viscosity) and low crystallinity. The polymer can be prepared utilizing any appropriate catalyst, but preferably the catalyst described below. Any number of polymers having a selected composition (e.g., monomer type and content) and properties can be formed.

The low crystalline polymer can be prepared by polymerizing in a polymerization zone in a solvent a combined feed of a monomer system and a catalyst system to provide a mixture that includes the ethylene polymer, said ethylene polymer preferably being a random copolymer of ethylene and propylene derived units, wherein the ethylene polymer is either noncrystalline or has ethylene-type crystallinity.

In a broadest form, the low crystalline ethylene polymer can be prepared using any single sited catalyst. Such a catalyst may be a transition metal complex generally containing a transition metal Groups 3 to 10 of the Periodic Table; and at least one ancillary ligand that remains bonded to the transition metal during polymerization. Preferably the transition metal is used in a reduced cationic state and stabilized by a cocatalyst or activator.

In at least one embodiment, a polymerization process consists of or includes a polymerization in the presence of a catalyst including a bis(cyclopentadienyl) metal compound and either (1) a non-coordinating compatible anion activator, or (2) an alumoxane activator. Non-limiting examples of catalyst systems which can be used are described in U.S. Pat. Nos. 5,198,401 and 5,391,629. In a particular aspect of this embodiment, an alumoxane activator can be used in an amount to provide a molar aluminum to metallocene ratio of from 1:1 to 20,000:1. In another particular aspect of this embodiment, a non-coordinating compatible anion activator can be used in an amount to provide a molar ratio of biscyclopentadienyl metal compound to non-coordinating anion of from 10:1 to 1:1. In yet another particular aspect of this embodiment, the polymerization reaction is conducted by reacting monomers in the presence of a catalyst system described herein at a temperature of from –0° C. to 200° C. for a time of from 1 second to 10 hours.

In certain embodiments, the low crystalline ethylene polymer of the present invention may be produced in the presence of a chiral metallocene catalyst with an activator and optional scavenger. The use of single site catalysts is preferred to enhance the homogeneity of the polymer. As only a limited tacticity is needed many different forms of single site catalyst may be used. Possible single site catalysts are metallocenes, such as those described in U.S. Pat. No. 5,026,798, which have a single cyclopentadienyl ring, advantageously substituted and/or forming part of a polycyclic structure, and a hetero-atom, generally a nitrogen atom, but possibly also a phosphorus atom or phenoxy group connected to a group 4 transition metal, preferably titanium but possibly zirconium or hafnium. A further example is Me5CpTiMe3 activated with B(CF)3 as used to produce polypropylene with an Mn of up to 4 million. See Sassmannshausen, Bochmann, Rosch, Lilge, J. Organomet. Chem. (1997) 548, pp. 23-28.

Other possible single site catalysts are metallocenes which are bis cyclopentadienyl derivatives having a group transition metal, preferably hafnium or zirconium. Such metallocenes may be unbridged as in U.S. Pat. Nos. 4,522,982 or 5,747,621. The metallocene may be adapted for producing a polymer comprising predominantly propylene derived units as in U.S. Pat. No. 5,969,070 which uses an unbridged bis(2-phenyl indenyl) zirconium dichloride to produce a homogeneous polymer having a melting point of above 79° C. The cyclopentadienyl rings may be substituted and/or part of polycyclic systems as described in the above U.S. patents.

Other possible metallocenes include those in which the two cyclopentadienyl groups are connected through a bridge, generally a single atom bridge such as a silicon or carbon atom with a choice of groups to occupy the two remaining valencies. Such metallocenes are described in U.S. Pat. No. 6,048,950 which discloses bis(indenyl)bis (dimethylsilyl) zirconium dichloride and MAO; International Patent Publication No. WO98/27154 which discloses a dimethylsilyl bridged bisindenyl hafnium dimethyl together with a non-coordinating anion activator; EP1070087 which discloses a bridged biscyclopentadienyl catalyst which has elements of asymmetry between the two cyclopentadienyl ligands to give a polymer with elastic properties; and the metallocenes described in U.S. Pat. Nos. 6,448,358 and 6,265,212.

The manner of activation of the single site catalyst can vary. Alumoxane and preferably methyl alumoxane can be used. Higher molecular weights can be obtained using non- or weakly coordinating anion activators (NCA) derived and generated in any of the ways amply described in published patent art such as EP277004, EP426637, and many others. Activation generally is believed to involve abstraction of an anionic group such as the methyl group to form a metallocene cation, although according to some literature zwitterions may be produced. The NCA precursor can be an ion pair of a borate or aluminate in which the precursor cation is eliminated upon activation in some manner, e.g., trityl or ammonium derivatives of tetrakis pentafluorophenyl boron (See EP277004). The NCA precursor can be a neutral compound such as a borane, which is formed into a cation by the abstraction of and incorporation of the anionic group abstracted from the metallocene (See EP426638).

During the polymerization process described above, the appropriate catalyst may be delivered to the reactor in a variety of ways. For example, it may be delivered as a solution or slurry activated in-line just prior to the reactor, or preactivated and pumped as an activated solution or slurry to the reactor. Polymerization is carried out in a reactor, in which reactant components (e.g., desired monomers, comonomers, catalyst/activators, scavengers, and optional modifiers) are preferably added continuously to the reactor.

In an embodiment, a catalyst mixture comprising one or more catalysts may be present in the single reactor used to prepare the low crystalline ethylene polymer.

In certain embodiments of the processes and compositions, catalysts described in U.S. Pat. No. 6,207,756 can be used in the polymerization process, and that patent is hereby incorporated by reference in its entirety, particularly the portions describing the catalyst, e.g., column 8 line 20 through column 14, line 21. Preferred catalysts are those that are isospecific. The catalyst is preferably 1,1'-bis(4-triethylsilylphenyl)methylene-(cyclopentadienyl)(3,8-di-tertiary-butyl-1-fluroenyl)hafnium dimethyl with dimethylaninliniumtetrakis(pentafluorophenyl)borate activator.

The low crystalline ethylene polymer described herein which is richer in ethylene, preferably contains about 50 to 90% ethylene, and more preferably containing 50 to 75% ethylene; is made with a metallocene catalyst in a suitable polymerization reactor vessel.

In certain methods, the monomers (also called reactants) are dissolved in a hydrocarbon solvent. The hydrocarbon solvent may be one of the monomers or may be an inert solvent. In the preferred method, a solvent, such as pentane, hexane, heptane, octane, or other paraffins, are employed.

The solvents may be used in combination or singly. In some instances, cycloalkanes, or aromatic solvents, such as toluene, may also be used. Such solvents are often selected because they provide a better medium in which to dissolve the catalyst. It is also possible to use mixtures of different types of solvents.

Such processes where the reactions are carried out in a solvent are referred to herein as solution processes. Solution processes provide improved heat transfer and reduce the viscosity of the polymer, thereby making it easier to handle. The monomers are dissolved in a hydrocarbon solvent and this 'mixed-feed' stream is fed to the reactor. Monomers and the solvent can also be fed to the reactor via separate inlets. Catalyst and activator are then introduced into the reactor via an injection port. The activation of the catalyst may be conducted outside the reactor and the activated catalyst complex then introduced into the reactor. In another preferred method, the catalyst components may be injected separately into the reactor, in which case, the activated complex is formed in-situ in the reactor. In certain instances, it may be preferable to inject the catalyst into the mixed feed stream prior to entering the reactor.

In another configuration, the copolymer is made in slurry reactors. The product and/or the catalyst may be present in concentrations that exceed their solubility in the solvent/s used. The insoluble components of these species then form a slurry in the carrier fluid.

In yet another configuration, the slurry reactor is used to influence the monomer concentration in the proximity of the growing chains, thereby influencing the morphology of the copolymer.

In another embodiment, the copolymer is produced in a single plug flow reactor. The catalyst is then deactivated by introducing polar materials, such as water, alcohols, or amines, prior to further downstream purification. The polymeric product that is made is then separated from the carrying medium or solvent by several methods that are known and commonly practiced in industry. In certain methods, the polymer in solution is separated into a polymer-rich or heavy phase and a polymer-poor or lean phase. The pressure and temperature in the separator is adjusted to enhance enrichment of the polymer preferentially in the rich phase. The lighter phase which has very little polymer in it, floats to the top and is removed. The rich phase is then further concentrated by flash evaporation of the solvent before it is fed into a devolatilizing mixer or extruder. A cross-head extruder is mounted at the exit of the devolatizer to further squeeze the polymer through a die plate. In one embodiment of the invention, the polymer is directly extruded through a die plate and pelletized as it leaves the devolatizer. The polymer is cut into little pellets using an under-water pelletizer. In an embodiment, the polymer may be pelletized by a strand cutter or other pelletizers known in the industry. The pellets are conveyed to a spin dryer to remove the water. The pellets then make their way into a fluidized bed dryer to remove moisture and other volatile components. The dry product is then packaged for sale.

Low Crystalline Ethylene Polymer Blend Composition

In another preferred embodiment, the ethylene copolymer useful with the present invention may comprise a low crystalline ethylene polymer blend composition. The low crystalline ethylene polymer blend composition described herein is a reactor blend. The reactor blends include at least a first polymer (ethylene polymer) and a second polymer (propylene polymer), as discussed below. The process to make the low crystalline ethylene polymer blend composition is described at least at U.S. Patent Application Ser. No. 62/268,112, filed on Dec. 16, 2015, and 62/315,929, filed on Mar. 31, 2016, the contents of which are incorporated herein by reference.

A "reactor blend" herein distinguished from a "physical blend", the latter being the combination of two or more polymers that have already been formed and recovered before being mixed or otherwise combined, e.g., separated (which would preferably also include being devolatilized) from some or all of the remaining polymerization mixture (e.g., unreacted monomers and/or solvent) and then combined together.

The reactor blend compositions preferably include at least a propylene polymer and an ethylene polymer, although the ethylene polymer is in some cases identifiable by inference and/or by fractionation. In certain embodiments, the reactor blend includes a major portion by weight (more than 65 wt %) ethylene polymer with a minor portion (less than 35 wt %) propylene polymer.

In certain embodiments of the reactor blend, the first polymer and second polymer form a substantially homogenous reactor blend, meaning that the first polymer and second polymer are part of, or are within, or occupy, the same phase. In other embodiments of the reactor blend, the first polymer and second polymer form distinct phases of a multiphase composition. In certain multiphase embodiments, a reactor blend includes a continuous phase (either the first polymer or the second polymer), which may be a dispersed phase (dispersion) and a discontinuous phase (either the first polymer or the second polymer), which may be a matrix phase. In those embodiments, either the continuous phase or the dispersed phase may represent a major portion of the reactor blend. Also, at least one embodiment of the reactor blend is a multiphase composition having a continuous phase that includes first polymer as a minor portion of the reactor blend and a dispersed phase that includes second polymer as a major portion. Further, in any of the above embodiments, the second polymer can be crosslinked. The various polysplit ranges identified above may be used.

The blends described herein are formed in either batch or continuous "multistage polymerization," meaning that two (or more) different polymerizations (or polymerization stages) are conducted. More specifically, a multistage polymerization may involve either two or more sequential polymerizations (also referred to herein as a "series process") or two or more parallel polymerizations (also referred to herein as a "parallel process"). Preferably, the polymerization is conducted in a parallel process.

The blends described herein include a first polymer component (first polymer), which preferably is (or includes) an elastomer that is predominantly ethylene, i.e., having more than 30 wt % or 40 wt %, or 50 wt % units derived from ethylene monomer. The crystallinity, and hence other properties as well, of the first polymer are preferably different from those of the second polymer.

The first polymer described herein is predominantly ethylene, i.e., having more than 70 wt % units derived from ethylene monomer. In one or more of the compositions described herein, the ethylene content of the ethylene polymer is greater than or equal to about 65 wt %, preferably greater than about 70 wt %, or 75 wt % to less than about 85 wt % or about 90 wt %. In an embodiment, the ethylene polymer has a propylene content of less than about 30 wt %, preferably 25%, or 23 wt % to greater than about 15 wt % or about 10 wt %. In an embodiment, the ethylene polymer has a $C_4$-$C_{20}$ α-olefin content of less than about 5 wt %. Preferably, the first polymer (also referred to as the "ethylene polymer") has some crystalline (including "semi-crystalline"), also referred to herein as "crystallinity derived from ethylene." But any crystallinity of the first polymer is preferably derived from the ethylene. The percent crystallinity in such cases is measured as a percentage of polyethylene crystallinity and thus the origin of the crystallinity from ethylene is established.

Preferably, in addition to units derived from ethylene, the first polymer also includes units derived from an α-olefin monomer. Suitable α-olefin monomers include, but are not limited to propylene, butene, pentene, hexene, heptene, or octene, and their isomers. Advantageously, the first polymer can be formulated using different α-olefin monomers, selected from the list above, and/or different amounts of monomers, e.g., ethylene and α-olefin monomers, to prepare different types of polymers, e.g., ethylene polymers having desired properties.

Preferably, the first polymer is formed during (or by) the first polymerization, which in the case of a parallel process, involving parallel polymerization and/or parallel reactors, the "first polymer" may be formed at the same time as the "second polymer," but the product streams (still including solvent) are combined after the first and second polymers are sufficiently formed.

The propylene polymer should have (at minimum) 40 wt % propylene units, and preferably more, as noted below. The propylene polymer is preferably a polypropylene copolymer having 60 wt % or more units derived from propylene, having isotactically arranged propylene derived sequences and having a heat of fusion less than 45 J/g. Also, the polypropylene copolymer preferably has at least 5 wt % non-propylene comonomer units, e.g., ethylene units, and more preferably at least 10 wt % or more ethylene units.

The propylene polymer preferably comprises at least 60 wt %, more preferably at least 75 wt % propylene-derived units. In some embodiments, the propylene polymer comprises from about 75 to about 95 wt % of propylene-derived units, more preferably from about 80 to about 90 wt % of propylene-derived units, the balance comprising one or more α-olefins. Other suitable embodiments include propylene derived units in an amount (based on the weight of propylene and α-olefin) ranging from about 75 to about 93 wt %, more preferably about 75 to about 92.5 wt %, more preferably about 75 to about 92 wt %, more preferably about 75 to about 92.5 wt %, more preferably about 82.5 to about 92.5 wt %, and more preferably about 82.5 to about 92 wt %. Corresponding α-olefin ranges include about 5 to about 25 wt %, more preferably about 7 to about 25 wt %, more preferably about 7.5 to about 25 wt %, more preferably about 7.5 to about 17.5 w % and more preferably about 8 to about 17.5 wt % (based on the weight of propylene and α-olefin). A preferred α-olefin is ethylene. The propylene polymer preferably has a MFR no higher than about 800, more preferably no higher than about 500, more preferably no higher than about 200, more preferably no higher than about 100, more preferably no higher than about 50. Particularly preferred embodiments include a propylene polymer with an MFR of from about 1 to about 25, more preferably about 1 to about 20. The crystallinity of the first polymer should be derived from isotactic polypropylene sequences. The isotacticity of the propylene polymer can be illustrated by the presence of a preponderance of the propylene residues in the polymer in mm triads. As noted elsewhere herein, the tacticity of the propylene polymer is preferably greater than the tacticity of either the reactor blend or the ethylene polymer, e.g., where the propylene polymer is isotactic and the ethylene polymer is atactic.

The crystallinity of the propylene polymer can be expressed in terms of heat of fusion. The propylene polymer of the invention can have a heat of fusion, as determined by DSC, ranging from a lower limit of 1 J/g, or 1.5 J/g, or 3 J/g, or 4 J/g, or 6 J/g, or 7 J/g or 10, to an upper limit of 20 or 30 J/g, or 40 J/g, or 50 J/g, or 60 J/g, or 75 J/g. Preferably, the heat of fusion of the propylene polymer is less than 45 J/g. Without wishing to be bound by theory, it is believed that the propylene polymer has generally isotactic crystallizable propylene sequences, and the above heats of fusion are believed to be due to the melting of these crystalline segments.

The level of crystallinity of the propylene polymer can also be reflected in its melting point. Preferably, the propylene polymer has a single melting point. However, a sample of propylene copolymer will often show secondary melting peaks adjacent to the principal peak. The highest peak is considered the melting point. The propylene polymer described herein can have a melting point by DSC within the range having an upper limit of 115° C., or 110° C., or 105° C., or 90° C., or 80° C., or 70° C., and a lower limit of 0° C., or 20° C., or 25° C., or 30° C., or 35° C., or 40° C., or 45° C. Preferably, the propylene polymer has a melting point of less than 105° C., and more preferably less than 100° C., and even more preferably less than 90° C. Also, it is preferred that the propylene polymer have a melting point greater than about 25° C., or 40° C.

For the propylene polymer, at least 75% by weight of the polymer, or at least 80% by weight, or at least 85% by weight, or at least 90% by weight, or at least 95% by weight, or at least 97% by weight, or at least 99% by weight of the polymer is soluble in a single temperature fraction, or in two adjacent temperature fractions, with the balance of the polymer in immediately preceding or succeeding temperature fractions. These percentages are fractions, for instance in hexane, beginning at 23° C. and the subsequent fractions are in approximately 8° C. increments above 23° C. Meeting such a fractionation requirement means that a polymer has statistically insignificant intermolecular differences of tacticity of the polymerized propylene.

In certain embodiments, the percentage of mm triads in the propylene polymer, as determined by the method for determining triad tacticity, is in the range having an upper limit of 98%, or 95%, or 90%, or 85%, or 82%, or 80%, or 75%, and a lower limit of 50%, or 60%. Certain propylene polymers have an isotacticity index greater than 0%, or within the range having an upper limit of 50%, or 25% and a lower limit of 3%, or 10%. Certain propylene polymers can have a tacticity index (m/r) within the range having an upper limit of 800, or 1000, or 1200, and those polymers may have a lower limit of 40, or 60.

The second polymerization may in certain cases be conducted in the presence of an α-olefin; thus the resulting polymer formed when such α-olefin is present will include "units derived" from such α-olefin. Either the same α-olefin or different α-olefins can be introduced to the first and second polymerizations. Particular examples of those α-olefins are $C_3$-$C_{20}$ α-olefins, include, but are not limited to propylene; butene-1; pentene-1,2-methylpentene-1,3-methylbutene-1; hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene- 1; nonene-1; dimethyloctene-1; trimethylheptene-1; ethyloctene-1; methylethylbutene-1; diethylhexene-1; dodecene-I and hexadodecene-1.

The low crystalline elastomeric composition that comprises an ethylene polymer and a propylene polymer can be prepared by a continuous process. Such process may comprise: polymerizing in a first polymerization zone in a solvent a combined feed of a first monomer system and a first catalyst system to provide a mixture that includes the ethylene polymer, said ethylene polymer preferably being a random copolymer of ethylene and propylene derived units, wherein the ethylene polymer is either noncrystalline or has ethylene-type crystallinity; polymerizing in a second polymerization zone in a solvent a feed of a second monomer system and a second catalyst system capable of providing isotactic stereoregularity to sequences of propylene derived units to provide a mixture of the propylene polymer and unreacted monomers, said propylene polymer preferably having 60 wt % or more units derived from propylene, including isotactically arranged propylene derived sequences and further having a heat of fusion less than 45 J/g or a melting point less than 105° C. or both and a Mooney Viscosity (ML (1+4)@ 125° C.) of from 1 to 45; and combining in the presence of the solvent the propylene polymer and the ethylene polymer wherein the combination of the propylene polymer and the ethylene polymer has a Mooney (ML 1+4 at 125° C.) of from 25 to 180, preferably 25 to 40, and a heat of fusion less than 50 J/g.

In a broadest form, the blend compositions can be prepared using any single sited catalyst. Such a catalyst may be a transition metal complex generally containing a transition metal Groups 3 to 10 of the Periodic Table; and at least one ancillary ligand that remains bonded to the transition metal during polymerization. Preferably the transition metal is used in a reduced cationic state and stabilized by a cocatalyst or activator.

In at least one embodiment, a polymerization process consists of or includes a polymerization in the presence of a catalyst including a bis(cyclopentadienyl) metal compound and either (1) a non-coordinating compatible anion activator, or (2) an alumoxane activator. Non-limiting examples of catalyst systems which can be used are described in U.S. Pat. Nos. 5,198,401 and 5,391,629. In a particular aspect of this embodiment, an alumoxane activator can be used in an amount to provide a molar aluminum to metallocene ratio of from 1:1 to 20,000:1. In another particular aspect of this embodiment, a non-coordinating compatible anion activator can be used in an amount to provide a molar ratio of biscyclopentadienyl metal compound to non-coordinating anion of from 10:1 to 1:1. In yet another particular aspect of this embodiment, the polymerization reaction is conducted by reacting monomers in the presence of a catalyst system described herein at a temperature of from 0° C. to 200° C. for a time of from 1 second to 10 hours.

In certain embodiments, the propylene polymer of the present invention may be produced in the presence of a chiral metallocene catalyst with an activator and optional scavenger. The use of single site catalysts is preferred to enhance the homogeneity of the polymer. As only a limited tacticity is needed many different forms of single site catalyst may be used. Possible single site catalysts are metallocenes, such as those described in U.S. Pat. No. 5,026,798, which have a single cyclopentadienyl ring, advantageously substituted and/or forming part of a polycyclic structure, and a hetero-atom, generally a nitrogen atom, but possibly also a phosphorus atom or phenoxy group connected to a group 4 transition metal, preferably titanium but possibly zirconium or hafnium. A further example is Me5CpTiMe3 activated with B(CF)3 as used to produce elastomeric polypropylene with an Mn of up to 4 million. See Sassmannshausen, Bochmann, Rosch, Lilge, J. Organomet. Chem. (1997) 548, 23-28.

Other possible single site catalysts are metallocenes which are bis cyclopentadienyl derivatives having a group transition metal, preferably hafnium or zirconium. Such metallocenes may be unbridged as in U.S. Pat. Nos. 4,522,982 or 5,747,621. The metallocene may be adapted for producing a polymer comprising predominantly propylene derived units as in U.S. Pat. No. 5,969,070 which uses an unbridged bis(2-phenyl indenyl) zirconium dichloride to produce a homogeneous polymer having a melting point of above 79° C. The cyclopentadienyl rings may be substituted and/or part of polycyclic systems as described in the above U.S. patents.

Other possible metallocenes include those in which the two cyclopentadienyl groups are connected through a bridge, generally a single atom bridge such as a silicon or carbon atom with a choice of groups to occupy the two remaining valencies. Such metallocenes are described in U.S. Pat. No. 6,048,950 which discloses bis(indenyl)bis (dimethylsilyl) zirconium dichloride and MAO; WO 98/27154 which discloses a dimethylsilyl bridged bisindenyl hafnium dimethyl together with a non-coordinating anion activator; EP1070087 which discloses a bridged biscyclopentadienyl catalyst which has elements of asymmetry between the two cyclopentadienyl ligands to give a polymer with elastic properties; and the metallocenes described in U.S. Pat. Nos. 6,448,358 and 6,265,212.

The manner of activation of the single site catalyst can vary. Alumoxane and preferably methyl alumoxane can be used. Higher molecular weights can be obtained using non- or weakly coordinating anion activators (NCA) derived and generated in any of the ways amply described in published patent art such as EP 277 004, EP 426 637, and many others. Activation generally is believed to involve abstraction of an anionic group such as the methyl group to form a metallocene cation, although according to some literature zwitterions may be produced. The NCA precursor can be an ion pair of a borate or aluminate in which the precursor cation is eliminated upon activation in some manner, e.g., trityl or ammonium derivatives of tetrakis pentafluorophenyl boron (See EP 277 004). The NCA precursor can be a neutral compound such as a borane, which is formed into a cation by the abstraction of and incorporation of the anionic group abstracted from the metallocene (See EP 426 638).

As noted elsewhere herein, polymerizations in the different reactors may in certain embodiments be conducted in the presence of the same catalyst mixtures, and in other embodiments be conducted in the presence of different catalyst mixtures. As used herein, the term "catalyst mixture" (catalyst system) includes at least one catalyst and at least one activator, although depending on the context, any reference herein to "catalyst" usually also implies an activator as well.

The appropriate catalyst mixture may be delivered to the respective reactor in a variety of ways. For example, it may be delivered as a solution or slurry, either separately to the reactor, activated in-line just prior to the reactor, or preactivated and pumped as an activated solution or slurry to the reactor. Polymerizations are carried out in each reactor, in which reactant components (e.g., desired monomers, comonomers, catalyst/activators, scavengers, and optional modifiers) are preferably added continuously to the appropriate reactor. In some embodiments, both catalyst mixtures are added to the first reactor, while in other embodiments one catalyst mixture is added to the first reactor and a different catalyst mixture is added to the second reactor (although in a sequential operation at least some of the first catalyst mixture from the first reactor may be directed to the second reactor together with the product mixture from the first reactor).

In preferred embodiments, two different catalysts are added as part of different reactant feeds, e.g., a "first catalyst," which may be part of a "first reactant feed," and a "second catalyst," which may be part of a "second reactant feed," although in at least certain embodiments (e.g., series reactors) both first and second catalysts are present to some degree in the second reactor feed, e.g., when the first effluent is supplied to a second reactor. Preferably, in at least certain embodiments, the first catalyst is a chiral catalyst while the second catalyst is a non-chiral catalyst.

In certain embodiments of the processes and compositions, the same catalyst mixture can be used for each of the first and second polymerizations, whether series or parallel. For example, in certain processes, certain catalyst mixtures described in U.S. Pat. No. 6,207,756 can be used in both polymerizations, and that patent is hereby incorporated by reference in its entirety, particularly the portions describing the catalyst mixtures, e.g., column 8 line 20 through column 14, line 21. Preferred catalysts are those that are isospecific.

The first catalyst is preferably 1,1'-bis(4-triethylsilylphenyl)methylene-(cyclopentadienyl) (3,8-di-tertiary-butyl-1-fluroenyl)hafnium dimethyl with dimethylaninliniumtetrakis(pentafluorophenyl)borate activator. The second catalyst is preferably dimethylsilylbis(indenyl)hafnium dimethyl with dimethylaniliniumtetrakis(heptafluoronaphthyl)borate activator.

Test methods to measure crystallinity derived from ethylene, heat of fusion, reactivity ratio, proportion of inversely propylene units, and branching index are disclosed in U.S. Patent Application Ser. No. 62/268,112, filed on Dec. 16, 2015, incorporated herein by reference.

Propylene-Based Elastomer

The propylene-based elastomer that can be used as ethylene copolymer described herein is a copolymer of propylene-derived units and units derived from at least one of ethylene or a $C_4$-$C_{10}$ α-olefin. The propylene-based elastomer may contain at least about 50 wt % propylene-derived units. The propylene-based elastomer may have limited crystallinity due to adjacent isotactic propylene units and a melting point as described herein. The crystallinity and the melting point of the propylene-based elastomer can be reduced compared to highly isotactic polypropylene by the introduction of errors in the insertion of propylene. The propylene-based elastomer is generally devoid of any substantial intermolecular heterogeneity in tacticity and comonomer composition, and also generally devoid of any substantial heterogeneity in intramolecular composition distribution.

The amount of propylene-derived units present in the propylene-based elastomer may range from an upper limit of about 95 wt %, about 94 wt %, about 92 wt %, about 90 wt %, or about 85 wt %, to a lower limit of about 60 wt %, about 65 wt %, about 70 wt %, about 75 wt %, about 80 wt %, about 84 wt %, or about 85 wt % of the propylene-based elastomer.

The units, or comonomers, derived from at least one of ethylene or a $C_4$-$C_{10}$ α-olefin may be present in an amount of about 1 to about 35 wt %, or about 5 to about 35 wt %, or about 7 to about 32 wt %, or about 8 to about 25 wt %, or about 8 to about 20 wt %, or about 8 to about 18 wt %, of the propylene-based elastomer. The comonomer content may be adjusted so that the propylene-based elastomer has a heat of fusion of less than about 80 J/g, a melting point of about 105° C. or less, and a crystallinity of about 2% to about 65% of the crystallinity of isotactic polypropylene, and a melt flow rate (MFR) of about 2 to about 20 g/min.

In preferred embodiments, the comonomer is ethylene, 1-hexene, or 1-octene, with ethylene being most preferred. In embodiments where the propylene-based elastomer comprises ethylene-derived units, the propylene-based elastomer may comprise about 5 to about 25 wt %, or about 8 to about 20 wt %, or about 9 to about 16 wt %, ethylene-derived units. In some embodiments, the propylene-based elastomer consists essentially of units derived from propylene and ethylene, i.e., the propylene-based elastomer does not contain any other comonomer in an amount other than that typically present as impurities in the ethylene and/or propylene feedstreams used during polymerization, or in an amount that would materially affect the heat of fusion, melting point, crystallinity, or melt flow rate of the propylene-based elastomer, or in an amount such that any other comonomer is intentionally added to the polymerization process.

In some embodiments, the propylene-based elastomer may comprise more than one comonomer. Preferred embodiments of a propylene-based elastomer having more than one comonomer include propylene-ethylene-octene, propylene-ethylene-hexene, and propylene-ethylene-butene polymers. In embodiments where more than one comonomer derived from at least one of ethylene or a $C_4$-$C_{10}$ α-olefin is present, the amount of one comonomer may be less than about 5 wt % of the propylene-based elastomer, but the combined amount of comonomers of the propylene-based elastomer is about 5 wt % or greater.

The propylene-based elastomer may have a triad tacticity of three propylene units, as measured by 13C NMR, of at least about 75%, at least about 80%, at least about 82%, at least about 85%, or at least about 90%. Preferably, the propylene-based elastomer has a triad tacticity of about 50 to about 99%, or about 60 to about 99%, or about 75 to about 99%, or about 80 to about 99%. In some embodiments, the propylene-based elastomer may have a triad tacticity of about 60 to 97%.

The propylene-based elastomer has a heat of fusion ("Hf"), as determined by DSC, of about 80 J/g or less, or about 70 J/g or less, or about 50 J/g or less, or about 40 J/g or less. The propylene-based elastomer may have a lower limit Hf of about 0.5 J/g, or about 1 J/g, or about 5 J/g. For example, the Hf value may range from about 1.0, 1.5, 3.0, 4.0, 6.0, or 7.0 J/g, to about 30, 35, 40, 50, 60, 70, 75, or 80 J/g.

The propylene-based elastomer may have a percent crystallinity, as determined according to the DSC procedure described herein, of about 2 to about 65%, or about 0.5 to about 40%, or about 1 to about 30%, or about 5 to about 35%, of the crystallinity of isotactic polypropylene. The thermal energy for the highest order of propylene (i.e., 100% crystallinity) is estimated at 189 J/g. In some embodiments, the copolymer has crystallinity less than 40%, or in the range of about 0.25 to about 25%, or in the range of about 0.5 to about 22% of the crystallinity of isotactic polypropylene.

Embodiments of the propylene-based elastomer may have a tacticity index m/r from a lower limit of about 4, or about 6, to an upper limit of about 8, or about 10, or about 12. In some embodiments, the propylene-based elastomer has an isotacticity index greater than 0%, or within the range having an upper limit of about 50%, or about 25%, and a lower limit of about 3%, or about 10%.

In some embodiments, the propylene-based elastomer may further comprise diene-derived units (as used herein, "diene"). The optional diene may be any hydrocarbon structure having at least two unsaturated bonds wherein at least one of the unsaturated bonds is readily incorporated into a polymer. For example, the optional diene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, norbornadiene, alkenyl norbornenes, alkylidene norbornenes, e.g., ethylidiene norbornene ("ENB"), cycloalkenyl norbornenes, and cycloalkylidene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene); and cycloalkenyl-substituted alkenes, such as vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. The amount of diene-derived units present in the propylene-based elastomer may range from an upper limit of about 15%, about 10%, about 7%, about 5%, about 4.5%, about 3%, about 2.5%, or about 1.5%, to a lower limit of about 0%, about 0.1%, about 0.2%, about 0.3%, about 0.5%, about 1%, about 3%, or about 5%, based on the total weight of the propylene-based elastomer.

The propylene-based elastomer may have a single peak melting transition as determined by DSC. In some embodiments, the copolymer has a primary peak transition of about 90° C. or less, with a broad end-of-melt transition of about 110° C. or greater. The peak "melting point" ("Tm") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the Tm of the propylene-based elastomer. The propylene-based elastomer may have a Tm of about 110° C. or less, about 105° C. or less, about 100° C. or less, about 90° C. or less, about 80° C. or less, or about 70° C. or less. In some embodiments, the propylene-based elastomer has a Tm of about 25 to about 105° C., or about 60 to about 105° C., or about 70 to about 105° C., or about 90 to about 105° C.

The propylene-based elastomer may have a density of about 0.850 to about 0.900 g/cm3, or about 0.860 to about 0.880 g/cm3, at room temperature as measured per ASTM D1505.

The propylene-based elastomer may have a melt flow rate ("MFR"), as measured per ASTM D1238, 2.16 kg at 230° C., of at least about 2 g/10 min. In some embodiments, the propylene-based elastomer may have an MFR of about 2 to about 20 g/10 min, or about 2 to about 10 g/10 min, or about 2 to about 5 g/10 min.

The propylene-based elastomer may have an Elongation at Break of less than about 2000%, less than about 1800%, less than about 1500%, less than about 1000%, or less than about 800%, as measured per ASTM D412.

The propylene-based elastomer may have a weight average molecular weight (Mw) of about 5,000 to about 5,000,000 g/mole, or about 10,000 to about 1,000,000 g/mole, or about 50,000 to about 400,000 g/mole. The propylene-based elastomer may have a number average molecular weight (Mn) of about 2,500 to about 250,000 g/mole, or about 10,000 to about 250,000 g/mole, or about 25,000 to about 250,000 g/mole. The propylene-based elastomer may have a z-average molecular weight (Mz) of about 10,000 to about 7,000,000 g/mole, or about 80,000 to about 700,000 g/mole, or about 100,000 to about 500,000 g/mole.

The propylene-based elastomer may have a molecular weight distribution ("MWD") of about 1.5 to about 20, or about 1.5 to about 15, or about 1.5 to about 5, or about 1.8 to about 3, or about 1.8 to about 2.5.

In some embodiments, the propylene-based elastomer is an elastomer including propylene-crystallinity, a melting point by DSC equal to or less than 105° C., and a heat of fusion of from about 5 J/g to about 45 J/g. The propylene-derived units are present in an amount of about 80 to about 90 wt %, based on the total weight of the propylene-based elastomer. The ethylene-derived units are present in an amount of about 8 to about 18 wt %, for example, about 8, about 8.5, about 9, about 9.5, about 10, about 10.5, about 11, about 11.5, about 12, about 12.5, about 13, about 13.5, about 14, about 14.5, about 15, about 15.5, about 16, about 16.5, about 17, about 17.5, about 18 wt %, based on the total weight of the propylene-based elastomer.

The compositions disclosed herein may include one or more different propylene-based elastomers, i.e., propylene-based elastomers each having one or more different properties such as, for example, different comonomer or comonomer content. Such combinations of various propylene-based elastomers are all within the scope of the invention.

The propylene-based elastomer may comprise copolymers prepared according to the procedures described in WO 02/36651, U.S. Pat. No. 6,992,158, and/or WO 00/01745. Preferred methods for producing the propylene-based elastomer may be found in U.S. Pat. Nos. 7,232,871 and 6,881,800. The invention is not limited by any particular polymerization method for preparing the propylene-based elastomer, and the polymerization processes are not limited by any particular type of reaction vessel.

Suitable propylene-based elastomers may be available commercially under the trade names VISTAMAXX™ (ExxonMobil Chemical Company), VERSIFY™ (The Dow Chemical Company), certain grades of TAFMER™ XM or NOTIO™ (Mitsui Company), and certain grades of SOFTEL™ (Basell Polyolefins).

Ethylene-Propylene Rubber

The ethylene copolymer described herein can also comprise an ethylene-propylene rubber. In an embodiment, the ethylene-propylene rubber is ethylene-propylene-diene terpolymer (EPDM). The ethylene-propylene rubber may have a Mooney viscosity (ML [1+4] 125° C.) of from about 25 to about 300, or from 50 to 120, or from 60 to 100, as determined according to ASTM D1646. In some embodiments, the ethylene-propylene rubber has a Mooney viscosity (ML [1+4] 125° C.) of from about 25, about 30, about 35, about 40, about 45, about 50, about 55, about 60, about 65, about 70, to about 75, about 80, about 85, about 90, about 95, about 100, about 105, about 110, about 115, about 120, about 125, about 130, about 135, about 140, about 145, about 150, about 155, about 160, about 165, about 170, about 175, about 180, about 185, about 190, about 195, about 200, about 205, about 210, about 215, about 220, about 225, about 230, about 235, about 240, about 245, about 250, about 255, about 260, about 265, about 270, about 275, about 280, about 285, about 290, about 295, or about 300, or in the range of any combination of the values recited herein.

The ethylene-propylene rubber may have an ethylene content, as determined by ASTM D3900, of from about 40, about 41, about 42, about 43, about 44, about 45, about 46, about 47, about 48, about 49, about 50, about 51, about 52, about 53, about 54, about 55, about 56, about 57, about 58, about 59, about 60, about 61, about 62, about 63, about 64, about 65, to about 70, about 71, about 72, about 73, about 74, about 75, about 76, about 77, about 78, about 79, about 80, about 81, about 82, about 83, about 84, about 85, about 86, about 87, about 88, about 89, about 90 wt % of the EPDM, or in the range of any combination of the values recited herein.

In some embodiments, the ethylene-propylene rubber has a Mooney viscosity (ML [1+4] 125° C.) of about 25 to about 300 and an ethylene content of at least about 40 wt % of the ethylene-propylene rubber. In other embodiments, the ethylene-propylene rubber has a Mooney viscosity (ML [1+4] 125° C.) of about 50 to about 120, and an ethylene content of about 50 to about 75 wt % of the ethylene-propylene rubber. In yet other embodiments, the ethylene-propylene rubber has a Mooney viscosity (ML [1+4] 125° C.) of about 60 to about 100, and an ethylene content of about 50 to about 60 wt % of the ethylene-propylene rubber.

In the case where the ethylene-propylene rubber is EPDM, the amount of the diene-derived units (or "diene") in the EPDM may vary from about 0.3 to about 15 wt %, or from about 2 to about 12 wt %, or from about 5 to about 10 wt %, or from about 7 to about 10 wt %. Suitable dienes include, for example: 1,4-hexadiene, 1,6-octadiene, 5-methyl-1,4-hexadiene, 3,7-dimethyl-1,6-octadiene, dicyclopentadiene (DCPD), ethylidiene norbornene (ENB), norbornadiene, 5-vinyl-2-norbornene (VNB), and combinations thereof. Preferred dienes include ENB and VNB.

The ethylene content of the EPDM is determined by ASTM D3900, and is not corrected for diene content. The diene content of an EPDM containing ENB may be determined by FTIR, ASTM D6047. The diene content of an EPDM containing VNB may be measured via 1H NMR. These methods measure available unsaturation. Thus, the measured incorporation may be lower than the actual incorporation because dienes having pendant unsaturated moieties have been converted, e.g., by hydrogen, and are not detected in the measurement. If the EPDM contains both ENB and VNB, 13C NMR is preferably used to determine diene content.

The ethylene-propylene rubber described herein preferably have a MWD of from about 2 to about 20. As used herein, MWD (Mw/Mn) is determined according to methods well known in the art, for example by GPC (Gel Permeation Chromatography) on a Waters 150 gel permeation chromatograph equipped with a differential refractive index (DRI) detector and a Chromatix KMX-6 on line light scattering photometer. The system is used at 135° C. with 1,2,4-trichlorobenzene as the mobile phase using Shodex (Showa Denko America, Inc.) polystyrene gel columns 802, 803, 804, and 805. This technique is discussed in "Liquid Chromatography of Polymers and Related Materials III," J. Cazes editor, Marcel Dekker, 1981, p. 207, which is incorporated herein by reference. No corrections for column spreading are employed; however, data on generally accepted standards, e.g., National Bureau of Standards Polyethylene 1484 and anionically produced hydrogenated polyisoprenes (alternating ethylene-propylene copolymers) demonstrate that such corrections on MWD are less than 0.05 units. Mw/Mn is calculated from elution times. The numerical analyses are performed using the commercially available Beckman/CIS customized LALLS software in conjunction with the standard Gel Permeation package. Reference to Mw/Mn implies that the Mw is the value reported using the LALLS detector and Mn is the value reported using the DRI detector described above.

Preferred ethylene-propylene rubber have a triad tacticity, as measured by 13C NMR, of 75% or greater, 80% or greater, 82% or greater, 85% or greater, or 90% or greater. The 13C NMR spectrum of the ethylene-propylene rubber is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm), and a third region (19.5-20.3 ppm). Each peak in the spectrum was assigned with reference to the article in the journal Polymer, Volume 30 (1989), page 1350. The calculation of the triad tacticity is outlined in the techniques shown in U.S. Pat. No. 5,504,172.

The ethylene-propylene rubber may have a heat of fusion ($\Delta Hf$) which is greater than or equal to about 0.5 Joules per gram (J/g), or greater than or equal to about 1 J/g, or greater than or equal to about 2.5 J/g, greater than or equal to about 5 J/g. Preferably the ethylene-propylene rubber polymers also have a heat of fusion that is less than or equal to about 70 J/g, or less than or equal to about 50 J/g, or less than or equal to about 35 J/g, or less than or equal to about 25 J/g. Thermodynamic heat of fusion data may be determined by differential scanning calorimetry (DSC), the procedure for which is as follows. About 6 to about 10 mg of a sheet of the polymer pressed at approximately 200° C. to 230° C. and cooled at ambient conditions (25° C. and 50% humidity for 24 hours) is removed with a punch die. This sample is annealed at room temperature for 80 to 100 hours. At the end of the annealing period, the sample is placed in a differential scanning calorimeter (Perkin Elmer 7 Series Thermal Analysis System) and cooled to −50° C. to −70° C. The sample is then heated at a rate of 20° C./min to a final temperature of 200° C. to 220° C. The thermal output is recorded as the area under the melting peak curve of the sample, which is typically peaked at 30° C. to 175° C., and occurs between the temperatures of 0° C. and 200° C. The thermal output in joules is a measure of the heat of fusion.

The ethylene-propylene rubber may have a % crystallinity of from 0.5 to 40, or 1 to 30, or 5 to 25, where the % crystallinity is determined according to the DSC procedure described herein. For use herein, the crystallinity of the ethylene-propylene rubber polymer can also be expressed in terms of percentage of crystallinity. The thermal energy for the highest order of polypropylene is estimated at 189 J/g (i.e., 100% crystallinity is equal to 189 J/g). In some embodiments, the ethylene-propylene rubber polymer has a crystallinity of less than 40%, preferably about 0.25% to about 25%, or from about 0.5% to about 22%, or from about 0.5% to about 20%.

The ethylene-propylene rubber preferably has a single broad melting transition. The melting point is defined as the temperature of the greatest heat absorption within the range of melting of the sample. However, the ethylene-propylene rubber may show secondary melting peaks adjacent to the principal peak, but for purposes herein, such secondary melting peaks are considered together as a single melting point, with the highest of these peaks being considered the melting point (Tm) of the ethylene-propylene rubber. The ethylene-propylene rubber preferably has a melting point of from about 25° C. to 105° C., or from about 25° C. to about 85° C., or from about 25° C. to about 75° C., or from about 25° C. to about 65° C., or from about 30° C. to about 80° C., or from about 30° C. to about 70° C., or from about 30° C. to about 60° C.

Suitable ethylene-propylene rubbers may be commercially available under the trade name VISTALON™ (ExxonMobil Chemical Company).

Ethylene-Based Plastomer

Preferred ethylene-based plastomers useful as ethylene copolymers in the multilayer film described herein include those having about 15 to about 35 wt % units derived from $C_4$-$C_{10}$ α-olefins, based on total weight of the ethylene-based plastomer, which may have an: ethylene content of 50 to 90 wt % (preferably 60 to 85 wt %, or 65 to 80 wt %, or 65 to 75 wt %); ethylene content of 80 to 96 mol % (preferably 82 to 92 mol %, or 82 to 88 mol %, or 84 to 86 mol %); butene-1 content of 15 wt % or more (preferably 20 wt % or more, or 25 wt % or more); hexene-1 content of 20 wt % or more (preferably 25 wt % or more, or 30 wt % or more); and/or octene-1 content of 25 wt % or more (preferably 30 wt % or more, or 35 wt % or more).

Useful ethylene-based plastomers may have one or more of the following properties: density of 0.91 g/cm$^3$ or less (preferably 0.905 g/cm$^3$ or less, or 0.902 g/cm$^3$ or less, or 0.85 g/cm$^3$ or more, or 0.86 g/cm$^3$ or more, or 0.87 g/cm$^3$ or more, or 0.88 g/cm$^3$ or more, or 0.885 g/cm$^3$ or more, or 0.85 to 0.91 g/cm$^3$, or 0.86 to 0.91 g/cm$^3$, or 0.87 to 0.91 g/cm$^3$, or 0.88 to 0.905 g/cm$^3$, or 0.88 to 0.902 g/cm$^3$, or 0.885 to 0.902 g/cm$^3$); heat of fusion (H$_f$) of 90 J/g or less (preferably 70 J/g or less, or 50 J/g or less, or 30 J/g or less, or 10 to 70 J/g, or 10 to 50 J/g, or 10 to 30 J/g); crystallinity of 40% or less (preferably 30% or less, or 20% or less, preferably at least 5%, or in the range of from 5 to 30%, or from 5 to 20%); melting point (Tm, peak first melt) of 100° C. or less (preferably 95° C. or less, or 90° C. or less, or 80° C. or less, or 70° C. or less, or 60° C. or less, or 50° C. or less); crystallization temperature (T$_c$, peak) of 90° C. or less (preferably 80° C. or less, or 70° C. or less, or 60° C. or less, or 50° C. or less, or 40° C. or less); glass transition temperature (T$_g$) of −20° C. or less (preferably −30° C. or less, or −40° C. or less); M$_w$ of 30 to 2,000 kg/mol (preferably 50 to 1,000 kg/mol, or 90 to 500 kg/mol); M$_w$/M$_n$ of 1 to 40 (preferably 1.4 to 20, or 1.6 to 10, or 1.8 to 3.5, or 1.8 to 2.5); branching index (g') 1.4 to 20 (preferably 1.6 to 10, or 1.8 to 10); melt index (MI, 2.16 kg at 190° C.) of 0.1 to 100 g/10 min (preferably 0.3 to 60 g/10 min, or 0.5 to 40 g/10 min, or 0.7 to 20 g/10 min); and/or Composition Distribution Breadth Index ("CDBI") of at least 60 wt % (preferably at least 70 wt %, or at least 80 wt %, or at least 90 wt %, or at least 95 wt %).

The method of making the ethylene-based plastomer can be slurry, solution, gas-phase, high-pressure, or other suitable processes, through the use of catalyst systems appropriate for the polymerization of polyolefins, such as Ziegler-Natta catalysts, metallocene catalysts, other appropriate catalyst systems, or combinations thereof.

Useful ethylene copolymers may be produced using a metallocene catalyst system, i.e., a mono- or bis-cyclopentadienyl transition metal catalysts in combination with an activator of alumoxane and/or a non-coordinating anion in solution, slurry, high-pressure, or gas-phase. The catalyst and activator may be supported or unsupported and the cyclopentadienyl rings by may substituted or unsubstituted. Information on the methods and catalysts/activators to produce such mPE homopolymers and copolymers is available in WO 94/26816; WO 94/03506; EPA 277,003; EPA 277,004; U.S. Pat. Nos. 5,153,157; 5,198,401; 5,240,894; 5,017, 714; CA 1,268,753; U.S. Pat. No. 5,324,800; EPA 129,368; U.S. Pat. No. 5,264,405; EPA 520,732; WO 92/00333; U.S. Pat. Nos. 5,096,867; 5,507,475; EPA 426 637; EPA 573 403; EPA 520 732; EPA 495 375; EPA 500 944; EPA 570 982; WO91/09882; WO94/03506; and U.S. Pat. No. 5,055,438. More generally, preferred plastomers are produced using a single-site catalyst, whether a metallocene catalyst or not, and have an Mw/Mn of 1.5 to 3 (preferably 1.8 to 2.5) and a CDBI of 70% or more (preferably 80% or more, or 90% or more).

Plastomers that are useful in this invention include those commercially available under the trade names EXACT™ (ExxonMobil Chemical Company), AFFINITYTm, ENGAGE™, FLEXOMER™ (The Dow Chemical Company), QUEO™ (Borealis AG, Austria), and TAFMER™ (Mitsui Company).

Ethylene-Vinyl Acetate (EVA)

The EVA suitable as the ethylene copolymer described herein may be a copolymer of ethylene and vinyl acetate, having a MI, I2.16, of from about 0.2 to about 20 g/10 min, from about 0.2 to about 9 g/10 min, from about 0.2 to about 3 g/10 min, or from about 0.2 to about 1 g/10 min. The EVA may have a vinyl acetate content (VA %) of from about 5 wt % to about 30 wt %, from about 5 wt % to about 20 wt %, or from about 5 wt % to about 10 wt %. In one embodiment, the EVA has a VA % greater than about 15 wt %. In particular, VA % of the EVA in the core layer is no lower than that in the inner sub-layer, and the VA % of the EVA in the inner sub-layer is no lower than that in the inner layer. Preferably, the VA % of the EVA in the inner sub-layer is higher than that in the inner layer. EVA copolymers useful in the present invention may include those commercially available from ExxonMobil Chemical Company as Escorene™ Ultra FL series resins.

In accordance with one embodiment of the present invention, the multilayer film comprises in the third layer described herein 100 wt % of a first ethylene copolymer (as an ethylene copolymer described herein), based on total weight of polymer in the third layer. In one preferred embodiment where the multilayer film further comprises a fourth layer and a fifth layer on the same side of the first layer opposite the third layer and the fourth layer is between the first layer and the fifth layer, the fourth layer comprises 100 wt % of a second ethylene copolymer (as an ethylene copolymer described herein), based on total weight of polymer in the fourth layer. In various embodiments, the first and the second (if present and applicable) ethylene copolymers may have one or more of the properties or be prepared by one of the methods described herein. The first and the second ethylene copolymers may be the same as or different from each other.

The first ethylene copolymer in the third layer and optionally the second ethylene copolymer in the fourth layer (if present) in the multilayer film may be optionally blended with one or more other polymers, such as ethylene copolymer, to form an ethylene copolymer composition. The ethylene copolymer composition may include up to 50 wt % of one or more different ethylene copolymers.

Other Polyethylenes

In one aspect of the invention, a polyethylene, not falling within the definition of the ethylene copolymer described above, may be used in place of the ethylene copolymer for the multilayer film, for example, in at least one of the first layer and the second layer. The polyethylene can be selected from ethylene homopolymers, ethylene copolymers, and combinations thereof. Useful copolymers comprise one or more comonomers in addition to ethylene and can be a random copolymer, a statistical copolymer, a block copolymer, and/or combinations thereof. The method of making the polyethylene includes slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment, the polyethylenes are made by the catalysts, activators and processes described in U.S. Pat. Nos. 6,342,566; 6,384,142; and 5,741,563; and WO 03/040201 and WO 97/19991. Such catalysts are well known in the art, and are described in, for example, ZIEGLER CATALYSTS (Gerhard Fink, Rolf Müllhaupt and Hans H. Brintzinger, eds., Springer-Verlag 1995); Resconi et al.; and I, II METALLOCENE-BASED POLYOLEFINS (Wiley & Sons 2000).

Polyethylenes that are useful in this invention include those sold by ExxonMobil Chemical Company, including HDPE, LLDPE, and LDPE; and those sold under the ENABLE™, EXACT™, EXCEED™, ESCORENE™, EXXCO™, ESCOR™ PAXON™ and OPTEMA™ tradenames.

Preferred ethylene homopolymers and copolymers useful in this invention typically have one or more of the following properties: an $M_w$ of 20,000 g/mol or more, 20,000 to 2,000,000 g/mol, preferably 30,000 to 1,000,000, preferably 40,000 to 200,000, preferably 50,000 to 750,000, as measured by size exclusion chromatography; and/or a $T_m$ of 30° C. to 150° C., preferably 30° C. to 140° C., preferably 50° C. to 140° C., more preferably 60° C. to 135° C., as determined based on ASTM D3418-03; and/or a crystallinity of 5% to 80%, preferably 10% to 70%, more preferably 20% to 60%, preferably at least 30%, or at least 40%, or at least 50%, as determined based on ASTM D3418-03; and/or a heat of fusion of 300 J/g or less, preferably 1 to 260 J/g, preferably 5 to 240 J/g, preferably 10 to 200 J/g, as determined based on ASTM D3418-03; and/or a crystallization temperature ($T_c$) of 15° C. to 130° C., preferably 20° C. to 120° C., more preferably 25° C. to 110° C., preferably 60° C. to 125° C., as determined based on ASTM D3418-03; and/or a heat deflection temperature of 30° C. to 120° C., preferably 40° C. to 100° C., more preferably 50° C. to 80° C. as measured based on ASTM D648 on injection molded flexure bars, at 66 psi load (455 kPa); and/or a Shore hardness (D scale) of 10 or more, preferably 20 or more, preferably 30 or more, preferably 40 or more, preferably 100 or less, preferably from 25 to 75 (as measured based on ASTM D 2240); and/or a percent amorphous content of at least 50%, preferably at least 60%, preferably at least 70%, more preferably between 50% and 95%, or 70% or less, preferably 60% or less, preferably 50% or less as determined by subtracting the percent crystallinity from 100.

The polyethylene may be an ethylene homopolymer, such as HDPE. In one embodiment, the ethylene homopolymer has a molecular weight distribution of up to 40. In another embodiment, the 1% secant flexural modulus (determined based on ASTM D790A, where test specimen geometry is as specified under the ASTM D790 section "Molding Materials (Thermoplastics and Thermosets)," and the support span is 2 inches (5.08 cm)) of the polyethylene falls in a range of 200 to 1000 MPa. The MI of preferred ethylene homopolymers range from 0.05 to 800 dg/min, as measured based on ASTM D1238 (190° C., 2.16 kg).

In a preferred embodiment, the polyethylene comprises less than 20 mol % propylene units (preferably less than 15 mol %, preferably less than 10 mol %, preferably less than 5 mol %, and preferably 0 mol % propylene units).

In another embodiment, the polyethylene is produced by polymerization of ethylene and, optionally, an alpha-olefin with a catalyst having, as a transition metal component, a bis (n-C3-4 alkyl cyclopentadienyl) hafnium compound, wherein the transition metal component preferably comprises from about 95 mol % to about 99 mol % of the hafnium compound as further described in U.S. Pat. No. 9,956,088.

In another embodiment of the invention, the polyethylene is an ethylene copolymer, either random or block, of ethylene and one or more comonomers selected from $C_3$ to C20 α-olefins, typically from C3 to C10 α-olefins. Preferably, the comonomers are present from 0.1 wt % to 50 wt % of the copolymer in one embodiment, and from 0.5 wt % to 30 wt % in another embodiment, and from 1 wt % to 15 wt % in yet another embodiment, and from 0.1 wt % to 5 wt % in yet another embodiment, wherein a desirable copolymer comprises ethylene and C3 to C20 α-olefin derived units in any combination of any upper wt % limit with any lower wt % limit described herein. Preferably the ethylene copolymer will have a weight average molecular weight of from greater than 8,000 g/mol, 10,000 g/mol, 12,000 g/mol, and 20,000 g/mol to less than 1,000,000 g/mol, and 800,000 g/mol wherein a desirable copolymer may comprise any upper molecular weight limit with any lower molecular weight limit described herein.

In another embodiment, the ethylene copolymer comprises ethylene and one or more other monomers selected from the group consisting of C3 to C20 linear, branched or cyclic monomers, and in some embodiments is a C3 to C12 linear or branched alpha-olefin, preferably butene, pentene, hexene, heptene, octene, nonene, decene, dodecene, 4-methylpentene-1,3-methyl pentene-1,3,5,5-trimethyl-hexene-1, and the like. The monomers may be present at up to 50 wt %, preferably from up to 40 wt %, more preferably from 0.5 wt % to 30 wt %, more preferably from 2 wt % to 30 wt %, more preferably from 5 wt % to 20 wt %, based on the total weight of the ethylene copolymer.

Preferred linear alpha-olefins useful as comonomers for the ethylene copolymers useful in this invention include C3 to C8 alpha-olefins, more preferably 1-butene, 1-hexene, and 1-octene, even more preferably 1-hexene. Preferred branched alpha-olefins include 4-methyl-1-pentene, 3-methyl-1-pentene, 3,5,5-trimethyl-1-hexene, and 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to C1 to C10 alkyl groups. Additionally, two adjacent substitutions may be joined to form a ring structure. Preferred aromatic-group-containing monomers contain at least one aromatic structure appended to a polymerizable olefinic moiety. Particularly, preferred aromatic monomers include styrene, alpha-methylstyrene, para-alkyl-styrenes, vinyltoluenes, vinylnaphthalene, allyl benzene, and indene, especially styrene, paramethyl styrene, 4-phenyl-1-butene and allyl benzene.

Preferred diolefin monomers useful in this invention include any hydrocarbon structure, preferably C4 to C30, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

In a preferred embodiment, one or more dienes are present in the polyethylene at up to 10 wt %, preferably at 0.00001 wt % to 2 wt %, preferably 0.002 wt % to 1 wt %, even more preferably 0.003 wt % to 0.5 wt %, based upon the total weight of the polyethylene. In some embodiments, diene is added to the polymerization in an amount of from an upper limit of 500 ppm to a lower limit of 50 ppm.

Preferred ethylene copolymers useful herein are preferably a copolymer comprising at least 50 wt % ethylene and having up to 50 wt %, preferably 1 wt % to 35 wt %, even more preferably 1 wt % to 6 wt % of a C3 to C20 comonomer, preferably a C4 to C8 comonomer, preferably hexene or octene, based upon the weight of the copolymer. Preferably these polymers are metallocene polyethylenes (mPEs).

Useful mPE homopolymers or copolymers may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from ExxonMobil Chemical Company under the tradename EXCEED™ Polyethylene or ENABLE™ Polyethylene.

In a class of preferred embodiments, the multilayer film described herein comprise in at least one of the first layer and the second layer a polyethylene derived from ethylene and one or more C3 to C20 α-olefin comonomers, based on total weight of polymer in the layer, wherein the polyethylene has a density of from about 0.900 to about 0.960 g/cm3, a melt index (MI), I2.16, of from about 0.1 to about 15 g/10 min, a molecular weight distribution (MWD) of from about 1.5 to about 5.5, and a melt index ratio (MIR), I21.6/I2.16, of from about 10 to about 100. In various embodiments, the above polyethylene may have one or more of the following properties: (a) a density (sample prepared according to ASTM D-4703, and the measurement according to ASTM D-1505) of about 0.900 to 0.940 g/cm$^3$; (b) an MI (1216, ASTM D-1238, 2.16 kg, 190° C.) of about 0.1 to about 15 g/10 min; (c) an MIR ($I_{21.6}$ (190° C., 21.6 kg)/$I_{2.16}$ (190° C., 2.16 kg)) of about 10 to about 100; (d) a CDBI of up to about 85%. The CDBI may be determined using techniques for isolating individual fractions of a sample of the resin. The preferred technique is Temperature Rising Elution Fraction ("TREF"), as described in Wild, et al., J. Poly. Sci., Poly. Phys. Ed., Vol. 20, p. 441 (1982), which is incorporated herein for purposes of U.S. practice; (e) an MWD of about 1.5 to about 5.5; MWD is measured using a gel permeation chromatograph ("GPC") equipped with a differential refractive index ("DRI") detector; and/or (f) a branching index of about 0.9 to about 1.0. Branching Index is an indication of the amount of branching of the polymer and is defined as g'=$[Rg]^2_{br}/[Rg]^2_{lin}$. "Rg" stands for Radius of Gyration, and is measured using a Waters 150 gel permeation chromatograph equipped with a Multi-Angle Laser Light Scattering ("MALLS") detector, a viscosity detector and a differential refractive index detector. "$[Rg]_{br}$" is the Radius of Gyration for the branched polymer sample and "$[Rg]_{lin}$" is the Radius of Gyration for a linear polymer sample.

The polyethylene is not limited by any particular method of preparation and may be formed using any process known in the art. For example, the polyethylene may be formed using gas phase, solution, or slurry processes.

In one embodiment, the polyethylene is formed in the presence of a metallocene catalyst. For example, the polyethylene may be an mPE produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. mPEs useful as the first polyethylene include those commercially available from ExxonMobil Chemical Company, such as those sold under the trade designation EXCEED™ or ENABLE™.

In another preferred embodiment, at least one of the first layer and the second layer of the multilayer film described herein further comprises an LDPE (as a polyethylene described herein). The LDPEs that are useful in the multilayer films described herein are ethylene-based polymers produced by free radical initiation at high pressure in a tubular or autoclave reactor as well known in the art. The LDPEs have a medium to broad MWD determined according to the procedure disclosed herein of higher than 4, preferably from 5 to 40, and a high level of long chain branching as well as some short chain branching. The density is generally greater than 0.910 g/cm$^3$ and is preferably from 0.920 to 0.940 g/cm$^3$. The MI may be less than 0.55 or 0.45 g/10 min. In one embodiment, the at least one of the first layer and the second layer may contain more than one type of LDPE.

In one preferred embodiment where the multilayer film further comprises a fourth layer and a fifth layer on opposite sides of the third layer and the fourth layer and the first layer are on the same side of the third layer, the fourth layer and the first layer may have the same composition while the fifth layer and the second layer may the same composition. In various embodiments, the fourth layer and the fifth layer, if present and applicable, may respectively comprise polyethylene having one or more of the properties or be prepared as defined above for the polyethylene described herein.

The polyethylene described herein may be present, e.g. in at least one of the first layer and the second layer, or the fourth layer and/or the fifth layer (if present and applicable), optionally in a blend with one or more other polymers, such as polyethylenes defined herein, which blend is referred to as polyethylene composition. In particular, the polyethylene compositions described herein may be physical blends or in situ blends of more than one type of polyethylene or compositions of polyethylenes with polymers other than polyethylenes where the polyethylene component is the majority component, e.g., greater than 50 wt % of the total weight of the composition. Preferably, the polyethylene composition is a blend of two polyethylenes with different densities. In a preferred embodiment, at least one of the first layer and the second layer comprises a polyethylene derived from ethylene and one or more C3 to C20 α-olefin comonomers, wherein the polyethylene has a density of from about 0.900 to about 0.960 g/cm3, a melt index (MI), I2.16, of from about 0.1 to about 15 g/10 min, a molecular weight distribution (MWD) of from about 1.5 to about 5.5, and a melt index ratio (MIR), I21.6/I2.16, of from about 10 to about 100, present in amount of at least about 80 wt %, based on total weight of polymer in the layer.

It has been surprisingly discovered that use of the elastic ethylene copolymer described herein in specific layers to prepare a multilayer film may significantly contribute to strengthened toughness-related properties of the multilayer film while optimizing balance among properties repulsive to each other, such as impact strength and tear resistance. Typically, when a three-layer structure is targeted, it is desired to have the ethylene copolymer take effect in the core layer between two outer layers. Optionally, if more layers are added to form, for example, a five-layer structure with two inner layers each between the core layer and each outer layer, the ethylene copolymer can be employed either in the core layer while each inner layer has the same composition as that of the outer layer on the same side of the core layer, or in the two inner layers while the core layer has the same composition as that of at least one of the two outer layers. Thus, by conforming to the structure-wise composition set out herein, the elastic ethylene copolymer described herein can benefit the inventive film with advantage in outstanding toughness profile over conventional film solutions where such elastic ethylene copolymer is absent.

Film Structures

The multilayer film of the present invention may further comprise additional layer(s). The additional layer(s) may be made from:

Polyolefins. Preferred polyolefins include homopolymers or copolymers of $C_2$ to $C_{40}$ olefins, preferably $C_2$ to $C_{20}$ olefins, preferably a copolymer of an α-olefin and another olefin or α-olefin (ethylene is defined to be an α-olefin for purposes of this invention). Preferably homopolyethylene, homopolypropylene, propylene copolymerized with ethylene and/or butene, ethylene copolymerized with one or more of propylene, butene or hexene, and optional dienes. Preferred examples include thermoplastic polymers such as ultra-low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and compositions of thermoplastic polymers and elastomers, such as, for example, thermoplastic elastomers and rubber toughened plastics.

Polar polymers. Preferred polar polymers include homopolymers and copolymers of esters, amides, acetates, anhydrides, copolymers of a $C_2$ to $C_{20}$ olefin, such as ethylene and/or propylene and/or butene with one or more polar monomers, such as acetates, anhydrides, esters, alcohol, and/or acrylics. Preferred examples include polyesters, polyamides, ethylene vinyl acetate copolymers, and polyvinyl chloride.

Cationic polymers. Preferred cationic polymers include polymers or copolymers of geminally disubstituted olefins, α-heteroatom olefins and/or styrenic monomers. Preferred geminally disubstituted olefins include isobutylene, isopentene, isoheptene, isohexane, isooctene, isodecene, and isodecene. Preferred α-heteroatom olefins include vinyl ether and vinyl carbazole, preferred styrenic monomers include styrene, alkyl styrene, para-alkyl styrene, α-methyl styrene, chloro-styrene, and bromo-para-methyl styrene. Preferred examples of cationic polymers include butyl rubber, isobutylene copolymerized with para methyl styrene, polystyrene, and poly-α-methyl styrene.

Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbond fibers, and non-wovens (particularly polypropylene spunbond fibers or non-wovens), and substrates coated with inks, dyes, pigments, and the like.

In particular, a multilayer film can also include layers comprising materials such as ethylene vinyl alcohol (EVOH), polyamide (PA), polyvinylidene chloride (PVDC), or aluminum, so as to obtain barrier performance for the film where appropriate.

The thickness of the multilayer films may range from 10 to 200 μm in general and is mainly determined by the intended use and properties of the film. Stretch films may be thin; those for shrink films or heavy duty bags are much thicker. Conveniently, the film has a thickness of from 10 to 200 μm, from 20 to 150 μm, from 30 to 120 μm, or from 40 to 100 μm. Preferably, the thickness ratio between the third layer and one of the first layer and the second layer is about 5:1 to about 1:5, for example, about 1:1, about 1:1.5, about 1:2, about 1:2.5, about 1:3, about 1:3.5, or about 1:4.

The multilayer film described herein may comprise a first layer, a second layer, and a third layer between the first layer and the second layer. The composition of the first layer and the second layer may be the same or different, but conform to the limitations set out herein. Preferably, the first layer and the second layer are identical. The film may further comprise a fourth layer and a fifth layer. In one preferred embodiment where the fourth layer and the fifth layer are on the same side of the first layer opposite the third layer and the fourth layer is between the first layer and the fifth layer, the fourth layer comprises 100 wt % of a second ethylene copolymer, based on total weight of polymer in the fourth layer. The second ethylene copolymer may have one or more of the properties or be prepared as defined above for the first ethylene copolymer described herein. The second ethylene copolymer may be the same as or different from the first ethylene copolymer. The composition of the fourth layer and the third layer may also be the same or different, but conform to the limitations set out herein. Preferably, the multilayer film has at least one of the following properties: (i) the fourth layer and the third layer are identical; and (ii) the fifth layer and at least one of the first layer and the second layer are identical. In another preferred embodiment where the fourth layer and the fifth layer are on opposite sides of the third layer and the fourth layer and the first layer are on the same side of the third layer, the multilayer film has at least one of the following properties: (i) the fourth layer and the first layer have the same composition; and (ii) the fifth layer and the second layer have the same composition.

The film may have at least 3 total layers. Embodiments of the film may include 5 total layers, 11 total layers, 33 total layers, or greater than 33 layers. The additional layers may be located in any of the following positions: between the first and third layer, between the second and third layer, between the first and fourth layer, the between fourth and fifth layer, and between the second and fifth layer. Such positions indicate location relative to other layers, but are not limited to contacting (e.g., located directly adjacent to) such layers. For example, three additional layers may be located between the first and third layer, where the middle of the three layers may also be said to be positioned between the first and third layer.

In a preferred embodiment, the multilayer film has a three-layer structure, comprising: (a) two outer layers, each comprising: (i) at least about 80 wt % of a polyethylene derived from ethylene and one or more C3 to C20 α-olefin comonomers, based on total weight of polymer in the outer layer, wherein the polyethylene has a density of from about 0.900 to about 0.960 g/cm3, an MI, I2.16, of from about 0.1 to about 15 g/10 min, an MWD of from about 1.5 to about 5.5, and an MIR, I21.6/I2.16, of from about 10 to about 100; and (ii) an LDPE; and (b) a core layer between the two outer layers comprising 100 wt % of an ethylene copolymer, selected from the group consisting of: (i) a low crystalline polymer comprising greater than or equal to about 70 wt % units derived from ethylene, less than or equal to about 30 wt % units derived from propylene, and less than about 5 wt % of units derived from C4-C20 α-olefins, based on total weight of the polymer, and having the following properties: (i') crystallinity derived from ethylene; (ii') a heat of fusion of about 20 to about 85 J/g; (iii') a polydispersity index (Mw/Mn) of less than about 2.5; (iv') a reactivity ratio of about 0.5 to about 1.5; (v') a proportion of inversely inserted propylene units based on 2, 1 insertion of propylene monomer in all propylene insertions, as measured by 13C NMR of less than 0.5 wt %; and (vi') a branching index greater than about 0.5; wherein the polymer is prepared in a single reactor; (ii) a low crystalline polymer blend composition, comprising: (i') from 65 wt % to 90 wt % based on the total weight of the blend of an ethylene α-olefin elastomer having either no crystallinity or crystallinity derived from ethylene, having 70 wt % or more units derived from ethylene; and (ii') from 10 wt % to 35 wt % based on the total weight of the blend of a propylene polymer having 40 wt % or more units derived from propylene, including isotactically arranged propylene derived sequences; wherein the ethylene α-olefin elastomer and the propylene polymer are prepared in separate reactors arranged in parallel configuration; (iii) a propylene-based elastomer, having at least about 60 wt % propylene-derived units and about 3 to about 25 wt % ethylene-derived units, based on total weight of the propylene-based elastomer, and a heat of fusion of less than about 80 J/g; (iv) an ethylene-propylene rubber; (v) an ethylene-based plastomer, having about 15 to about 35 wt % units derived from $C_4$-$C_{10}$ α-olefins, based on total weight of the ethylene-based plastomer; and (vi) an EVA. The thickness ration between the core layer and each of the outer layers may from about 5:1 to about 1:5. Preferably, the thickness ratio between the core layer and each of the outer layers is about 2:3.

In another embodiment, the multilayer film has a five-layer structure, comprising: (a) two outer layers, each comprising: (i) at least about 80 wt % of a polyethylene derived from ethylene and one or more C3 to C20 α-olefin comonomers, based on total weight of polymer in the outer layer, wherein the polyethylene has a density of from about 0.900 to about 0.960 g/cm3, an MI, I2.16, of from about 0.1 to about 15 g/10 min, an MWD of from about 1.5 to about 5.5, and an MIR, I21.6/I2.16, of from about 10 to about 100; and (ii) an LDPE; (b) a core layer between the two outer layers, comprising 100 wt % of an ethylene copolymer, selected from the group consisting of: (i) a low crystalline polymer comprising greater than or equal to about 70 wt % units derived from ethylene, less than or equal to about 30 wt % units derived from propylene, and less than about 5 wt % of units derived from $C_4$-$C_{20}$ α-olefins, based on total weight of the polymer, and having the following properties: (i') crystallinity derived from ethylene; (ii') a heat of fusion of about 20 to about 85 J/g; (iii') a polydispersity index (Mw/Mn) of less than about 2.5; (iv') a reactivity ratio of about 0.5 to about 1.5; (v') a proportion of inversely inserted propylene units based on 2, 1 insertion of propylene monomer in all propylene insertions, as measured by 13C NMR of less than 0.5 wt %; and (vi') a branching index greater than about 0.5; wherein the polymer is prepared in a single reactor; (ii) a low crystalline polymer blend composition, comprising: (i') from 65 wt % to 90 wt % based on the total weight of the blend of an ethylene α-olefin elastomer having either no crystallinity or crystallinity derived from ethylene, having 70 wt % or more units derived from ethylene; and (ii') from 10 wt % to 35 wt % based on the total weight of the blend of a propylene polymer having 40 wt % or more units derived from propylene, including isotactically arranged propylene derived sequences; wherein the ethylene α-olefin elastomer and the propylene polymer are prepared in separate reactors arranged in parallel configuration; (iii) a propylene-based elastomer, having at least about 60 wt % propylene-derived units and about 3 to about 25 wt % ethylene-derived units, based on total weight of the propylene-based elastomer, and a heat of fusion of less than about 80 J/g; (iv) an ethylene-propylene rubber; (v) an ethylene-based plastomer, having about 15 to about 35 wt % units derived from $C_4$-$C_{10}$ α-olefins, based on total weight of the ethylene-based plastomer; and (vi) an EVA; and (c) two inner layers each between the core layer and each outer layer, each of the inner layers comprising: (i) at least about 80 wt % of a polyethylene derived from ethylene and one or more $C_3$ to $C_{20}$ α-olefin comonomers, based on total weight of polymer in the outer layer, wherein the polyethylene has a density of from about 0.900 to about 0.960 g/cm3, an MI, I2.16, of from about 0.1 to about 15 g/10 min, an MWD of from about 1.5 to about 5.5, and an MIR, I21.6/I2.16, of from about 10 to about 100; and (ii) an LDPE.

In yet another embodiment, the multilayer film has a five-layer structure, comprising: (a) two outer layers, each comprising: (i) at least about 80 wt % of a polyethylene derived from ethylene and one or more $C_3$ to $C_{20}$ α-olefin comonomers, based on total weight of polymer in the outer layer, wherein the polyethylene has a density of from about 0.900 to about 0.960 g/cm3, an MI, I2.16, of from about 0.1 to about 15 g/10 min, an MWD of from about 1.5 to about 5.5, and an MIR, I21.6/I2.16, of from about 10 to about 100; and (ii) an LDPE; (b) a core layer between the two outer layers, the core layer comprising: (i) at least about 80 wt % of a polyethylene derived from ethylene and one or more C3 to C20 α-olefin comonomers, based on total weight of polymer in the outer layer, wherein the polyethylene has a density of from about 0.900 to about 0.960 g/cm3, an MI, I2.16, of from about 0.1 to about 15 g/10 min, an MWD of from about 1.5 to about 5.5, and an MIR, I21.6/I2.16, of from about 10 to about 100; and (ii) an LDPE; and (c) two inner layers each between the core layer and each outer layer, each of the inner layers comprising 100 wt % of an ethylene copolymer, based on total weight of polymer in the core layer, wherein the ethylene copolymer is selected from the group consisting of: (i) a low crystalline polymer comprising greater than or equal to about 70 wt % units derived from ethylene, less than or equal to about 30 wt % units derived from propylene, and less than about 5 wt % of units derived from $C_4$-$C_{20}$ α-olefins, based on total weight of the polymer, and having the following properties: (i') crystallinity derived from ethylene; (ii') a heat of fusion of about 20 to about 85 J/g; (iii') a polydispersity index (Mw/Mn) of less than about 2.5; (iv') a reactivity ratio of about 0.5 to about 1.5; (v') a proportion of inversely inserted propylene units based on 2, 1 insertion of propylene monomer in all propylene insertions, as measured by 13C NMR of less than 0.5 wt %; and (vi') a branching index greater than about 0.5; wherein the polymer is prepared in a single reactor; (ii) a low crystalline polymer blend composition, comprising: (i') from 65 wt % to 90 wt % based on the total weight of the blend of an ethylene α-olefin elastomer having either no crystallinity or crystallinity derived from ethylene, having 70 wt % or more units derived from ethylene; and (ii') from 10 wt % to 35 wt % based on the total weight of the blend of a propylene polymer having 40 wt % or more units derived from propylene, including isotactically arranged propylene derived sequences; wherein the ethylene α-olefin elastomer and the propylene polymer are prepared in separate reactors arranged in parallel configuration; (iii) a propylene-based elastomer, having at least about 60 wt % propylene-derived units and about 3 to about 25 wt % ethylene-derived units, based on total weight of the propylene-based elastomer, and a heat of fusion of less than about 80 J/g; (iv) an ethylene-propylene rubber; (v) an ethylene-based plastomer, having about 15 to about 35 wt % units derived from $C_4$-$C_{10}$ α-olefins, based on total weight of the ethylene-based plastomer; and (vi) an EVA. Preferably, the core layer and the two outer layers have the same composition.

Where the multilayer film has a five-layer A/B/X/B/A structure, the thickness ratio between each of the outer layers, each of the inner layers, and the core layer is about 2:1:2.

Film Properties and Applications

The multilayer film described herein or made according to any method disclosed herein may have at least one of the following properties: (i) a tear resistance of at least about 6% higher in the MD; (ii) a tear resistance of at least about 12% higher in the TD; and (iii) a dart impact of at least about 12% higher, compared to that of a film free of the ethylene copolymer, but is otherwise identical in terms of film structure, layers' compositions and the film's overall thickness.

The multilayer films of the present invention may useful for a variety of applications, including packaging, hygiene, and consumer goods. For example, the multilayer films may be used in packaging articles, such as trash bags, agricultural films, aluminum foil laminates, aluminum laminates, asphalt films, auto panel films, bacon packaging, bag-in-box liquid packaging applications, bakery goods, banana film, batch inclusion bags, bathroom tissue overwrap, biaxially oriented films, biaxially oriented polypropylene (BOPP) films, biscuits packages, boutique bags, bread bags, bubble wrap, building film, cake mix packaging, can liners, candy wrap, cardboard liquid packaging, carpet film, carry-out sacks, cement packaging, cereal liners, cheese packaging, chemical packaging, clarity films, coffee packaging, coin bags, collation shrink films, confectionary packaging, construction sheeting, construction film, consumer trash bags, continuous wrap, convenience packaging, cosmetics packaging, counter bags, cover film, cup/cutlery overwrap, deli and bakery wrap, detergent packaging, dry food packaging, dry grain bags, dunnage bags, fertilizer bags, fish & seafood packaging, food packaging, freeze-dried products, freezer films, frozen food packaging, fruit juice packaging, furniture bags, garden sacks, garment bags, gravel bags, grocery sacks, heavy duty-sacks, high clarity collation shrink film, high clarity films, high speed packaging applications, high stiffness overwrap film, horizontal form-fill-and-seal (HFFS) packaging, household wrap, ice bags, industrial hardware packaging, industrial liner, industrial trash bags, industrial spare parts packaging, in store self-service bags, insulation bags, institutional liners, juice bags, kitchen rolls, landscaping bags, lamination films, light duty shrink film, lime bags, liners, liquid packaging, liquid and granular food packaging, low stiffness overwrap film, magazine overwrap, mailer bags, mailers envelopes/sacks, masking film, mayonnaise packaging, meat packaging, medium duty bags, merchandise bags, metallized laminates, military hardware packaging, milk bags, milk powder packaging, modified atmosphere packaging, mulch film, multi-wall sack liner, newspaper bags, olive oil packaging, packaging of beans, packaging of cementations products such as grout, packaging of dry and sharp products, pallet shrink film, pancake batter bags, paper handkerchief overwrap, paper laminates, pasta overwrap, pelletized polymer bags, perfume packaging, personal care packaging, pesticides packaging, pharmaceuticals packaging, pigment packaging, pizza packaging, polyamide laminates, polyester laminates, potato product packaging, potting soil bags, pouches, poultry packaging, pre-formed pouches, produce bags, produce packaging, rack and counter film, ready-made food packaging, ready meal packaging, retortable product packaging, films for the rubber industry, sandwich bags, salt bags, sausage packaging, seafood packaging, shipping sacks, shrink bags, shrink bundling film, shrink film, shrink shrouds, shrink tray, shrink wrap, snack food packaging, soft drink packaging, soil bags, soup packaging, spice packaging, stand up pouches, storage bags, stretch films, stretch hooders, stretch wrap, supermarket bags, takeout food bags, textile films, refuse bags, thermoformed containers, thin films, tobacco packaging, tomato packaging, ketchup packaging, trash bags, t-shirt bags, vacuum skin packaging, vegetable packaging, vertical form-fill-and-seal (FFS) packaging, horizontal FFS packaging, tubular FFS packaging, and water bottle packaging. Hygiene articles may include, for example, diaper backsheet, disposables (diapers, sanitary, etc.), adult care items, hygiene overwrap films, incision drape, medical products, medical draping, nose tissue overwrap, surgical garb, and tissue overwrap. Other film applications may include foundation film, geomembrane liners, gloves, and green house films.

By using the elastic ethylene copolymer in a multilayer film as set out herein, the long-standing difficulty in improving film toughness as a combination of impact strength and tear resistance without highlighting one at the expense of compromising the other can be well addressed.

Methods for Making the Multilayer Film

Also provided are methods for making multilayer films of the present invention. A method for making a multilayer film, comprising the steps of: (a) preparing a first layer and a second layer; (b) preparing a third layer between the first layer and the second layer, the third layer comprising 100 wt % of a first ethylene copolymer, based on total weight of polymer in the third layer; and (c) forming a film comprising the layers in steps (a) and (b).

In one preferred embodiment, the method may further comprise after step (b) a step of preparing a fourth layer and a fifth layer on the same side of the first layer opposite the third layer, wherein the fourth layer is between the first layer and the fifth layer. In another preferred embodiment, the method may further comprise after step (b) a step of preparing a fourth layer and a fifth layer on opposite sides of the third layer, wherein the fourth layer and the first layer are on the same side of the third layer.

The method may further include preparing one or more additional layers, each of which may be located in any of the following positions: between the first and third layer, between the second and third layer, between the first and fourth layer, the between fourth and fifth layer, and between the second and fifth layer. Such positions indicate location relative to other layers, but are not limited to contacting (e.g., located directly adjacent to) such layers. For example, three additional layers may be located between the first and third layer, where the middle of the three layers may also be said to be positioned between the first and third layer.

The multilayer films described herein may be formed by any of the conventional techniques known in the art including blown extrusion, cast extrusion, coextrusion, blow molding, casting, and extrusion blow molding.

In one embodiment, the multilayer films of the present invention are formed by using blown techniques to form a blown film. For example, the composition described herein can be extruded in a molten state through an annular die and then blown and cooled to form a tubular, blown film, which can then be axially slit and unfolded to form a flat film. As a specific example, blown films may be prepared as follows. The polymer composition may be introduced into the feed hopper of an extruder, such as a 50 mm extruder that is water-cooled, resistance heated, and has an L/D ratio of 30:1. The film can be produced using a 28 cm W&H die with a 1.4 mm die gap, along with a W&H dual air ring and internal bubble cooling. The film is extruded through the die into a film cooled by blowing air onto the surface of the film. The film is drawn from the die typically forming a cylindrical film that is cooled, collapsed and, optionally, subjected to a desired auxiliary process, such as slitting, treating, sealing, or printing. Typical melt temperatures are from about 180° C. to about 230° C. Blown film rates are generally from about 3 to about 25 kilograms per hour per inch (about 4.35 to about 26.11 kilograms per hour per centimeter) of die circumference. The finished film can be wound into rolls for later processing. A particular blown film process and apparatus suitable for forming films according to embodiments of the present invention is described in U.S. Pat. No. 5,569,693.

The compositions prepared as described herein are also suited for the manufacture of blown film in a high-stalk extrusion process. In this process, a polyethylene melt is fed through a gap (typically 0.5 to 1.6 mm) in an annular die attached to an extruder and forms a tube of molten polymer which is moved vertically upward. The initial diameter of the molten tube is approximately the same as that of the annular die. Pressurized air is fed to the interior of the tube to maintain a constant air volume inside the bubble. This air pressure results in a rapid 3-to-9-fold increase of the tube diameter which occurs at a height of approximately 5 to 10 times the die diameter above the exit point of the tube from the die. The increase in the tube diameter is accompanied by a reduction of its wall thickness to a final value ranging from approximately 10 to 50 µm and by a development of biaxial orientation in the melt. The expanded molten tube is rapidly cooled (which induces crystallization of the polymer), collapsed between a pair of nip rolls and wound onto a film roll.

In blown film extrusion, the film may be pulled upwards by, for example, pinch rollers after exiting from the die and is simultaneously inflated and stretched transversely sideways to an extent that can be quantified by the blow up ratio (BUR). The inflation provides the transverse direction (TD) stretch, while the upwards pull by the pinch rollers provides a machine direction (MD) stretch. As the polymer cools after exiting the die and inflation, it crystallizes and a point is reached where crystallization in the film is sufficient to prevent further MD or TD orientation. The location at which further MD or TD orientation stops is generally referred to as the "frost line" because of the development of haze at that location.

Variables in this process that determine the ultimate film properties include the die gap, the BUR and TD stretch, the take up speed and MD stretch and the frost line height. Certain factors tend to limit production speed and are largely determined by the polymer rheology including the shear sensitivity which determines the maximum output and the melt tension which limits the bubble stability, BUR and take up speed.

A laminate structure with the inventive multilayer film prepared as described herein can be formed by lamination to a substrate film using any process known in the art, including solvent based adhesive lamination, solvent less adhesive lamination, extrusion lamination, and heat lamination.

EXAMPLES

The present invention, while not meant to be limited by, may be better understood by reference to the following example and tables.

The example illustrates toughness performance, as a combination of tear resistance and impact strength, demonstrated by inventive samples (Samples 1-14) of five layers comprising 100 wt % of an elastic ethylene copolymer in inner layers between the core layer and each outer layer, in comparison with comparative samples (Samples 1a and 1b) using in the inner layers the same ethylene composition as that in other layers instead of the ethylene copolymer but otherwise identical in terms of film structure, layers' compositions and the film's overall thickness. FIG. 1 illustrates a cross-sectional view of the film structure corresponding to Samples 1-14 of Example 1, according to embodiments of the invention.

Polymer products used in the samples include: low crystalline ethylene-propylene polymers EP1 (ethylene content: 77 wt %, density: 0.882 g/cm$^3$) and EP2 (ethylene content: 80 wt %, density: 0.889 g/cm$^3$) (ExxonMobil Chemical Company), low crystalline ethylene-propylene blend compositions EP3 (ethylene content: 74 wt %, density: 0.885 g/cm$^3$) and EP4 (ethylene content: 67 wt %, density: 0.869 g/cm$^3$) (ExxonMobil Chemical Company), VISTAMAXX™ 6102FL performance polymer (ethylene content: 16 wt %, density: 0.862 g/cm$^3$, MFR: 3 g/10 min) (ExxonMobil Chemical Company), VISTALON™ 805 ethylene-propylene rubber (ethylene content: 78 wt %, Mooney Viscosity (ML 1+4, 125° C.): 33 MU) (ExxonMobil Chemical Company), EXACT™ 9182 ethylene-based (butene) plastomer resin (ethylene content: 80 wt %, density: 0.884 g/cm$^3$, MI: 1.2 g/10 min) (ExxonMobil Chemical Company), EXACT™ 9071 ethylene-based (butene) plastomer resin (ethylene content: 74 wt %, density: 0.870 g/cm$^3$, MI: 0.54 g/10 min) (ExxonMobil Chemical Company), EXACT™ 9061 ethylene-based (butene) plastomer resin (ethylene content: 70 wt %, density: 0.863 g/cm$^3$, MI: 0.55 g/10 min) (ExxonMobil Chemical Company), QUEO™

0201 ethylene-based octene-1 plastomer resin (ethylene content: 81 wt %, density: 0.902 g/cm$^3$, MI: 1.1 g/10 min) (Borealis AG), QUEO™ 8201 ethylene-based octene-1 plastomer resin (ethylene content: 71 wt %, density: 0.882 g/cm$^3$, MI: 1.1 g/10 min) (Borealis AG, Austria), ESCORENE™ Ultra FL 00119 EVA copolymer resin (ethylene content: 81 wt %, density: 0.942 g/cm$^3$, MI: 0.65 g/10 min) (ExxonMobil Chemical Company), ESCORENE™ Ultra FL 00218 EVA copolymer resin (ethylene content: 82 wt %, density: 0.940 g/cm$^3$, MI: 1.7 g/10 min) (ExxonMobil Chemical Company), ESCORENE™ Ultra FL 00226 EVA copolymer resin (ethylene content: 74 wt %, density: 0.949 g/cm$^3$, MI: 2.0 g/10 min) (ExxonMobil Chemical Company), EXCEED™ 1018 KB mPE resin (density: 0.918 g/cm$^3$, MI: 1.0 g/10 min, MIR: 16) (ExxonMobil Chemical Company), and EXXONMOBIL™ LDPE LD 150BW LDPE resin (density: 0.923 g/cm$^3$, MI: 0.75 g/10 min) (ExxonMobil Chemical Company). All samples were prepared with a thickness of 50 μm at a layer thickness ratio of 2:1:2:1:2 on a W&H coextrusion blown film line with a BUR of 2.5. Samples were conditioned at 23° C.±2° C. and 50%±10% relative humidity for at least 40 hours prior to determination of all properties. Structure-wise formulations of the film samples are shown in Tables 1-3.

Elmendorf tear strength was measured in both MD and TD based on ASTM D1922-06a using the Tear Tester 83-11-01 from TMI Group of Companies and measures the energy required to continue a pre-cut tear in the test sample, presented as tearing force in gram. Samples were cut across the web using the constant radius tear die and were free of any visible defects (e.g., die lines, gels, etc.).

Dart impact was measured by a method following ASTM D1709 on a Dart Impact Tester Model C from Davenport Lloyd Instruments in which a pneumatically operated annular clamp is used to obtain a uniform flat specimen and the dart is automatically released by an electro-magnet as soon a sufficient air pressure is reached on the annular clamp. A dart with a 38.10±0.13 mm diameter hemispherical head dropped from a height of 0.66±0.01 m was employed. Dart impact measures the energy causing a film to fail under specified conditions of impact of a freely-falling dart. This energy is expressed in terms of the weight (mass, g) of the dart falling from a specified height, which would result in 50% failure of tested samples. Samples have a minimum width of 20 cm and a recommended length of 10 m.

TABLE 1

Structure-wise formulations and toughness properties for Example 1

| | Sample No. | | | |
|---|---|---|---|---|
| | 1 | 2 | 3 | 4 |
| Outer | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) |
| Inner | EP1 (100) | EP3 (100) | EP4 (100) | EP3 (100) |
| Core | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) |
| Inner | EP1 (100) | EP3 (100) | EP4 (100) | EP2 (100) |
| Outer | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) |
| Tear MD (g) | THTM 2* | THTM 1*/1648 | THTM 2 | THTM 2 |
| Tear TD (g) | THTM 2 | THTM 2 | THTM 2 | THTM 2 |
| Dart Drop (g) | 1008 | 1144 | 943 | 1336 |

| | Sample No. | | |
|---|---|---|---|
| | 5 | 6 | 1a |
| Outer | EXCEED 1018KB (95) LDPE LD 150BW (5) | EXCEED 1018KB (95) LDPE LD 150BW (5) | EXCEED 1018KB (95) LDPE LD 150BW (5) |
| Inner | EP2 (100) | VISTAMAXX 6102FL (100) | EXCEED 1018KB (95) LDPE LD 150BW (5) |
| Core | EXCEED 1018KB (95) LDPE LD 150BW (5) | EXCEED 1018KB (95) LDPE LD 150BW (5) | EXCEED 1018KB (95) LDPE LD 150BW (5) |
| Inner | VISTALON 805 (100) | VISTAMAXX 6102FL (100) | EXCEED 1018KB (95) LDPE LD 150BW (5) |
| Outer | EXCEED 1018KB (95) | EXCEED 1018KB (95) | EXCEED 1018KB (95) |

TABLE 1-continued

Structure-wise formulations and toughness properties for Example 1

|  | LDPE LD 150BW (5) | LDPE LD 150BW (5) | LDPE LD 150BW (5) |
|---|---|---|---|
| Tear MD (g) | THTM 1/589 | 856 | 553 |
| Tear TD (g) | THTM 2 | 998 | 885 |
| Dart Drop (g) | 1132 | 1030 | 838 |

*THTM 1: too high to measure, wherein some samples were not torn completely. THTM 2: too high to measure, wherein none or very few of the samples were not torn completely.

TABLE 2

Structure-wise formulations and toughness properties for Example 1

| | Sample No. | | | | | |
|---|---|---|---|---|---|---|
| | 7 | 8 | 9 | 10 | 11 | 1b |
| Outer | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) |
| Inner | EXACT 9182(100) | EXACT 9071 (100) | EXACT 9061 (100) | QUEO 0201 (100) | QUE08201 (100) | EXCEED 1018KB (95) LDPE LD 150BW (5) |
| Core | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) |
| Inner | EXACT 9182 (100) | EXACT 9071 (100) | EXACT 9061 (100) | QUEO 0201 (100) | QUEO 8201 (100) | EXCEED 1018KB (95) LDPE LD 150BW (5) |
| Outer | EXCEED1018KB (95) LDPE LD 150BW (5) | EXCEED1018KB (95) LDPE LD 150BW (5) | EXCEED 1018KB (95) LDPE LD 150BW (5) | EXCEED1018KB (95) LDPE LD 150BW (5) | EXCEED1018KB (95) LDPE LD 150BW (5) | EXCEED 1018KB (95) LDPE LD 150BW (5) |
| Elmendorf Tear MD (g) | THTM 1*/1001 | THTM 1/1204 | THTM 1/1108 | 641 | 597 | 518 |
| Elmendorf Tear TD (g) | THTM 2* | THTM 2 | THTM 2 | 1092 | 1030 | 836 |
| Dart Drop (g) | >1361* | >1361 | >1361 | >1361 | >1361 | 838 |

*THTM 1: too high to measure, wherein some samples were not torn completely; THTM 2: too high to measure, wherein none or very few of the samples were not torn completely; Dart >1361: no film damage observed by maximum weight of the dart.

TABLE 3

Structure-wise formulations and toughness properties for Example 1

| | Sample No. | | | |
|---|---|---|---|---|
| | 12 | 13 | 14 | 1b |
| Outer | EXCEED1018KB (95) LDPE LD 150BW (5) | EXCEED 1018KB (95) LDPE LD 150BW (5) | EXCEED 1018KB (95) LDPE LD 150BW (5) | EXCEED1018KB (95) LDPE LD 150BW (5) |
| Inner | ESCORENE Ultra FL 00119 (100) | ESCORENE Ultra FL 00218 (100) | ESCORENE Ultra FL 00226 (100) | EXCEED 1018KB (95) LDPE LD 150BW (5) |
| Core | EXCEED 1018KB (95) | EXCEED 1018KB (95) | EXCEED 1018KB (95) | EXCEED 1018KB (95) |

TABLE 3-continued

Structure-wise formulations and toughness properties for Example 1

| | Sample No. | | | |
|---|---|---|---|---|
| | 12 | 13 | 14 | 1b |
| Inner | LDPE LD 150BW (5) ESCORENE Ultra FL 00119 (100) | LDPE LD 150BW (5) ESCORENE Ultra FL 00218 (100) | LDPE LD 150BW (5) ESCORENE Ultra FL 00226 (100) | LDPE LD 150BW (5) EXCEED 1018KB (95) LDPE LD 150BW (5) |
| Outer | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) |
| Elmendorf Tear MD (g) | 882 | 864 | THTM 1*/1001 | 518 |
| Elmendorf Tear TD (g) | THTM 2* | 1931 | THTM 2 | 836 |
| Dart Drop (g) | >1361* | >1361 | >1361 | 838 |

*THTM 1: too high to measure, wherein some samples were not torn completely;
THTM 2: too high to measure, wherein none or very few of the samples were not torn completely;
Dart >1361: no film damage observed by maximum weight of the dart.

Example 2

Figure 2:
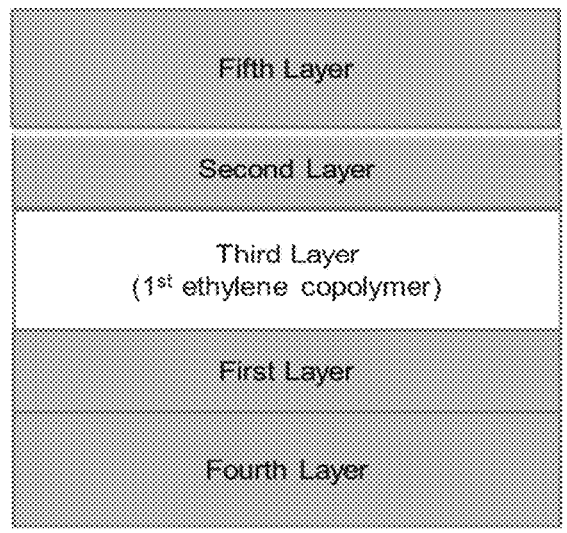
FIG. 2 illustrates a cross-sectional view of a film structure for the inventive films of Example 2, according to an embodiment of the invention.

Example 2 illustrates the same properties as in Example 1 demonstrated by inventive samples (Samples 15-24) of five layers comprising 100 wt % of an elastic ethylene copolymer in the core layer, in comparison with the comparative sample (Sample 1a) using in the core layer the same ethylene composition as that in other layers instead of the ethylene copolymer, but otherwise identical in terms of film structure, layers' compositions and the film's overall thickness. Structure-wise formulations of the film samples and test results are given in Tables 4-6. FIG. 2 illustrates a cross-sectional view of the film structure corresponding to Samples 15-24 of Example 2, according to embodiments of the invention.

TABLE 4

Structure-wise formulations and toughness properties for Example 2

| | Sample No. | | |
|---|---|---|---|
| | 15 | 16 | 1a |
| Outer | EXCEED 1018KB (95) LDPE LD 150BW (5) | EXCEED 1018KB (95) LDPE LD 150BW (5) | EXCEED1018KB (95) LDPE LD 150BW (5) |
| Inner | EXCEED 1018KB (95) LDPE LD 150BW (5) | EXCEED 1018KB (95) LDPE LD 150BW (5) | EXCEED 1018KB (95) LDPE LD 150BW (5) |
| Core | EP3 (100) | EP4 (100) | EXCEED1018KB (95) LDPE LD 150BW (5) |
| Inner | EXCEED 1018KB (95) LDPE LD 150BW (5) | EXCEED 1018KB (95) LDPE LD 150BW (5) | EXCEED 1018KB (95) LDPE LD 150BW (5) |
| Outer | EXCEED 1018KB (95) LDPE LD 150BW (5) | EXCEED 1018KB (95) LDPE LD 150BW (5) | EXCEED 1018KB (95) LDPE LD 150BW (5) |
| Elmendorf Tear MD (g) | 1148 | THTM 2 | 553 |
| Elmendorf Tear TD (g) | THTM 2* | THTM 2 | 885 |
| Dart Drop (g) | 1204 | 1144 | 838 |

*THTM 2: too high to measure, wherein none or very few of the samples were not torn completely.

TABLE 5

Structure-wise formulations and toughness properties for Example 2

| | | Sample No. | | | | | |
|---|---|---|---|---|---|---|---|
| | | 17 | 18 | 19 | 20 | 21 | 1a |
| | Outer | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) |

TABLE 5-continued

Structure-wise formulations and toughness properties for Example 2

| | Sample No. | | | | | |
|---|---|---|---|---|---|---|
| | 17 | 18 | 19 | 20 | 21 | 1a |
| Inner | EXCEED1018 KB (95) LDPE LD 150BW (5) | EXCEED1018 KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) |
| Core | EXACT 9182 (100) | EXACT 9071 (100) | EXACT 9061 (100) | QUEO 0201 (100) | QUEO 8201 (100) | EXCEED10 18KB (95) LDPE LD 150BW (5) |
| Inner | EXCEED 1018KB (95) LDPE LD 150BW (5) | EXCEED 1018KB (95) LDPE LD 150BW (5) | EXCEED1018 KB (95) LDPE LD 150BW (5) | EXCEED1018 KB (95) LDPE LD 150BW (5) | EXCEED 1018KB (95) LDPE LD 150BW (5) | EXCEED 1018KB (95) LDPE LD 150BW (5) |
| Outer | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) |
| Elmendorf Tear MD (g) | 1008 | 1083 | 1286 | 711 | 599 | 553 |
| Elmendorf Tear TD (g) | 1638 | THTM 2* | THTM 2 | 1192 | 1084 | 885 |
| Dart Drop (g) | >1361* | >1361 | >1361 | >1361 | >1361 | 838 |

*THTM 2: too high to measure, wherein none or very few of the samples were not torn completely; Dart >1361: no film damage observed by maximum weight of the dart.

TABLE 6

Structure-wise formulations and toughness properties for Example 2

| | Sample No. | | | |
|---|---|---|---|---|
| | 22 | 23 | 24 | 1a |
| Outer | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) |
| Inner | EXCEED1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) |
| Core | ESCORENE Ultra FL 00119 (100) | ESCORENE Ultra FL 00218 (100) | ESCORENE Ultra FL 00226 (100) | EXCEED LDPE LD 150BW (5) |
| Inner | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) |
| Outer | EXCEED 1018KB (95) LDPE LD 150BW (5) | EXCEED 1018KB (95) LDPE LD 150BW (5) | EXCEED 1018KB (95) LDPE LD 150BW (5) | EXCEED 1018KB (95) LDPE LD 150BW (5) |
| Elmendorf Tear MD (g) | 747 | 832 | 1032 | 553 |
| Elmendorf Tear TD (g) | THTM 2* | THTM 2 | THTM 2 | 885 |
| Dart Drop (g) | >1361* | >1361 | >1361 | 838 |

*THTM 2: too high to measure, wherein none or very few of the samples were not torn completely; Dart >1361: no film damage observed by maximum weight of the dart.

As shown in the tables, at a given total thickness and film structure, including the elastic ethylene copolymer described herein either in the core layer or in the two inner layers, the inventive samples had an improved balanced toughness performance, excelling simultaneously in tear resistance and impact strength, as represented by improvement in both Elmendorf tear strength and dart drop. Some inventive samples, such as low crystalline ethylene polymers, low crystalline ethylene polymer blend compositions, and ethylene-butane copolymers, the Elmendorf tear strength exceeded test capabilities where the films were not torn completely even when the heaviest pendulum of 6.4 kg was applied, and no damage was observed made to the film by maximum weight of the dart. Therefore, low crystalline ethylene polymers, low crystalline ethylene polymer blend compositions, and ethylene-butane copolymers are preferred choices compared to other elastic ethylene copolymers for use in the invention.

Without being bound by theory, it is believed that the elastic ethylene copolymers described herein improves toughness-related properties when used in a multilayer film. Therefore, the invention can address growing demands for strengthened toughness in films for a range of end-uses.

All documents described herein are incorporated by reference herein, including any priority documents and/or testing procedures. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention.

What is claimed is:

1. A multilayer film comprising a first layer, a second layer, and a third layer between the first layer and the second layer, wherein the third layer comprises 100 wt % of a first ethylene copolymer, based on total weight of polymer in the third layer;
    wherein the first ethylene copolymer comprises at least one of the following:
    (a) a low crystalline polymer comprising greater than or equal to about 70 wt % units derived from ethylene, less than or equal to about 30 wt % units derived from propylene, and less than about 5 wt % of units derived from $C_4$-$C_{20}$ α-olefins, based on total weight of the polymer, and having the following properties: (i) crystallinity derived from ethylene; (ii) a heat of fusion of about 20 to about 85 J/g; (iii) a polydispersity index ($M_w/M_n$) of less than about 2.5; (iv) a reactivity ratio of about 0.5 to about 1.5; (v) a proportion of inversely inserted propylene units based on 2, 1 insertions, as measured by $^{13}$C NMR of less than 0.5 wt %; and (vi) a branching index greater than about 0.5; wherein the polymer is prepared in a single reactor;
    (b) a low crystalline polymer blend composition, comprising: (i) from 65 wt % to 90 wt % based on the total weight of the blend of an ethylene α-olefin elastomer having either no crystallinity or crystallinity derived from ethylene, having 70 wt % or more units derived from ethylene; and (ii) from 10 wt % to 35 wt % based on the total weight of the blend of a propylene polymer having from 40 wt % to 90 wt % units derived from propylene, including isotactically arranged propylene derived sequences, and 10 wt % or more units derived from ethylene; wherein the ethylene α-olefin elastomer and the propylene polymer are prepared in separate reactors arranged in parallel configuration; and
    (c) an ethylene-propylene rubber;
    wherein the multilayer film has at least one of the following properties: (i) a tear resistance of at least about 6% higher in the Machine Direction (MD); (ii) a tear resistance of at least about 12% higher in the Transverse Direction (TD); and (iii) a dart impact of at least about 12% higher, compared to that of a film free of the first ethylene copolymer, but is otherwise identical in terms of film structure, layers' compositions and the film's overall thickness.

2. The multilayer film of claim 1, wherein at least one of the first layer and the second layer comprises at least about 80 wt % of a polyethylene derived from ethylene and one or more $C_3$ to $C_{20}$ α-olefin comonomers, based on total weight of polymer in the layer, wherein the polyethylene has a density of from about 0.900 to about 0.960 g/cm$^3$, a melt index (MI), $I_{2.16}$, of from about 0.1 to about 15 g/10 min, a polydispersity index ($M_w/M_n$) of from about 1.5 to about 5.5, and a melt index ratio (MIR), $I_{21.6}/I_{2.16}$, of from about 10 to about 100.

3. The multilayer film of claim 2, wherein the at least one of the first layer and the second layer further comprises a low density polyethylene (LDPE).

4. The multilayer film of claim 1, wherein the multilayer film has a tear resistance of at least about 25% higher in each of the Machine Direction (MD) and the Transverse Direction (TD) as compared to that of a film free of the first ethylene copolymer, but is otherwise identical in terms of film structure, layer compositions and overall film thickness.

5. The multilayer film of claim 1, wherein the multilayer film has a dart impact of at least about 25% higher as compared to that of a film free of the first ethylene copolymer, but is otherwise identical in terms of film structure, layer compositions and overall film thickness.

6. The multilayer film of claim 1, wherein the first layer and the second layer are the same.

7. The multilayer film of claim 1, further comprising a fourth layer and a fifth layer.

8. The multilayer film of claim 7, wherein the fourth layer and the fifth layer are on the same side of the first layer opposite the third layer, and the fourth layer is between the first layer and the fifth layer.

9. The multilayer film of claim 8, wherein the fourth layer comprises 100 wt % of a second ethylene copolymer, based on total weight of polymer in the fourth layer.

10. The multilayer film of claim 9, wherein the second ethylene copolymer comprises at least one of the following:
    (a) a low crystalline polymer comprising greater than or equal to about 70 wt % units derived from ethylene, less than or equal to about 30 wt % units derived from propylene, and less than about 5 wt % of units derived from $C_4$-$C_{20}$ α-olefins, based on total weight of the polymer, and having the following properties: (i) crystallinity derived from ethylene; (ii) a heat of fusion of about 20 to about 85 J/g; (iii) a polydispersity index ($M_w/M_n$) of less than about 2.5; (iv) a reactivity ratio of about 0.5 to about 1.5; (v) a proportion of inversely inserted propylene units based on 2, 1 insertion of propylene monomer in all propylene insertions, as measured by $^{13}$C NMR of less than 0.5 wt %; and (vi) a branching index greater than about 0.5; wherein the polymer is prepared in a single reactor;
    (b) a low crystalline polymer blend composition, comprising: (i) from 65 wt % to 90 wt % based on the total weight of the blend of an ethylene α-olefin elastomer having either no crystallinity or crystallinity derived from ethylene, having 70 wt % or more units derived from ethylene; and (ii) from 10 wt % to 35 wt % based on the total weight of the blend of a propylene polymer having 40 wt % or more units derived from propylene, including isotactically arranged propylene derived sequences; wherein the ethylene α-olefin elastomer and the propylene polymer are prepared in separate reactors arranged in parallel configuration;

(c) a propylene-based elastomer, having at least about 60 wt % propylene-derived units and about 3 to about 25 wt % ethylene-derived units, based on total weight of the propylene-based elastomer, and a heat of fusion of less than about 80 J/g;

(d) an ethylene-propylene rubber;

(e) an ethylene-based plastomer, having about 15 to about 35 wt % units derived from $C_4$-$C_{10}$ α-olefins, based on total weight of the ethylene-based plastomer; and (f) an EVA.

11. The multilayer film of claim 9, wherein the second ethylene copolymer is the same as the first ethylene copolymer.

12. The multilayer film of claim 8, the multilayer film having at least one of the following properties: (i) the fourth layer and the third layer are the same; and (ii) the fifth layer and at least one of the first layer and the second layer are the same.

13. The multilayer film of claim 7, wherein the fourth layer and the fifth layer are on opposite sides of the third layer and the fourth layer and the first layer are on the same side of the third layer.

14. The multilayer film of claim 13, the multilayer film having at least one of the following properties: (i) the fourth layer and the first layer have the same composition; and (ii) the fifth layer and the second layer have the same composition.

15. The multilayer film of claim 1, wherein the thickness ratio between the third layer and one of the first layer and the second layer is about 5:1 to about 1:5.

16. A packaging article comprising the multilayer film of claim 1.

17. A hygiene article comprising the multilayer film of claim 1.

18. A multilayer film comprising a plurality of layers, the plurality of layers comprising an ethylene copolymer layer comprising 100 wt % of a first ethylene copolymer, based on total weight of polymer in the ethylene copolymer layer;

wherein the first ethylene copolymer comprises at least one of the following:

(a) a low crystalline polymer comprising greater than or equal to about 70 wt % units derived from ethylene, less than or equal to about 30 wt % units derived from propylene, and less than about 5 wt % of units derived from $C_4$-$C_{20}$ α-olefins, based on total weight of the polymer, and having the following properties: (i) crystallinity derived from ethylene; (ii) a heat of fusion of about 20 to about 85 J/g; (iii) a polydispersity index ($M_w/M_n$) of less than about 2.5; (iv) a reactivity ratio of about 0.5 to about 1.5; (v) a proportion of inversely inserted propylene units based on 2, 1 insertion of propylene monomer in all propylene insertions, as measured by $^{13}C$ NMR of less than 0.5 wt %; and (vi) a branching index greater than about 0.5; wherein the polymer is prepared in a single reactor;

(b) a low crystalline polymer blend composition, comprising: (i) from 65 wt % to 90 wt % based on the total weight of the blend of an ethylene α-olefin elastomer having either no crystallinity or crystallinity derived from ethylene, having 70 wt % or more units derived from ethylene; and (ii) from 10 wt % to 35 wt % based on the total weight of the blend of a propylene polymer having from 40 wt % to 90 wt % units derived from propylene, including isotactically arranged propylene derived sequences, and 10 wt % or more units derived from ethylene; wherein the ethylene α-olefin elastomer and the propylene polymer are prepared in separate reactors arranged in parallel configuration; and (c) an ethylene-propylene rubber;

wherein the multilayer film has at least one of the following properties: (i) a tear resistance of at least about 25% higher in each of a Machine Direction (MD) and a Transverse Direction (TD); and (ii) a dart impact of at least about 25% higher, compared to that of a film free of the first ethylene copolymer, but is otherwise identical in terms of film structure, layer compositions and overall film thickness.

19. The multilayer film of claim 18, wherein the multilayer film further comprises a polyethylene-based layer comprising at least about 80 wt % of a polyethylene derived from ethylene and one or more $C_3$ to $C_{20}$ α-olefin comonomers, based on total weight of polymer in the polyethylene-based layer, wherein the polyethylene has a density of from about 0.900 to about 0.960 g/cm³, a melt index (MI), $I_{2.16}$, of from about 0.1 to about 15 g/10 min, a polydispersity index ($M_w/M_n$) of from about 1.5 to about 5.5, and a melt index ratio (MIR), $I_{21.6}/I_{2.16}$, of from about 10 to about 100.

20. A multilayer film comprising a first layer, a second layer, and a third layer between and in contact with each of the first layer and the second layer, wherein the third layer comprises 100 wt % of a first ethylene copolymer, based on total weight of polymer in the third layer;

wherein the first ethylene copolymer is a propylene-based elastomer, having at least about 60 wt % propylene-derived units and about 3 to about 25 wt % ethylene-derived units, based on total weight of the propylene-based elastomer, and a heat of fusion of less than about 80 J/g;

wherein the multilayer film has at least one of the following properties: (i) a tear resistance of at least about 6% higher in the Machine Direction (MD); (ii) a tear resistance of at least about 12% higher in the Transverse Direction (TD); and (iii) a dart impact of at least about 12% higher, compared to that of a film free of the first ethylene copolymer, but is otherwise identical in terms of film structure, layers' compositions and the film's overall thickness, and wherein at least one of the first layer and the second layer comprises at least about 80 wt % of a polyethylene derived from ethylene and one or more C3 to C20 α-olefin comonomers, based on total weight of polymer in the layer, wherein the polyethylene has a density of from about 0.900 to about 0.960 g/cm3, a melt index (MI), I2.16, of from about 0.1 to about 15 g/10 min, a polydispersity index (Mw/Mn) of from about 1.5 to about 5.5, and a melt index ratio (MIR), I21.6/I2.16, of from about 10 to about 100 and an LDPE.

* * * * *